US008415619B2

(12) United States Patent
Goodlett et al.

(10) Patent No.: US 8,415,619 B2
(45) Date of Patent: Apr. 9, 2013

(54) METHODS AND SYSTEMS FOR MASS SPECTROMETRY

(75) Inventors: David R. Goodlett, Seattle, WA (US); Scott R. Heron, East Kilbride (GB); Jonathan Cooper, Glasgow (GB)

(73) Assignee: University of Glascgow, Glasgow (GB)

( * ) Notice: Subject to any disclaimer, the term of this patent is extended or adjusted under 35 U.S.C. 154(b) by 0 days.

(21) Appl. No.: 13/296,793

(22) Filed: Nov. 15, 2011

(65) Prior Publication Data

US 2012/0145890 A1 Jun. 14, 2012

Related U.S. Application Data

(63) Continuation-in-part of application No. PCT/US2010/056724, filed on Nov. 15, 2010.

(60) Provisional application No. 61/261,198, filed on Nov. 13, 2009, provisional application No. 61/413,876, filed on Nov. 15, 2010.

(51) Int. Cl.
*H01J 49/26* (2006.01)
*G01N 23/00* (2006.01)

(52) U.S. Cl.
USPC ........ 250/288; 250/281; 250/282; 435/173.1; 435/173.6; 435/461

(58) Field of Classification Search .................. 250/288, 250/281, 282; 435/173.1, 173.6, 461
See application file for complete search history.

(56) References Cited

U.S. PATENT DOCUMENTS

| | | | | |
|---|---|---|---|---|
| 6,107,628 | A | 8/2000 | Smith et al. | |
| 6,287,765 | B1 * | 9/2001 | Cubicciotti | 435/6.11 |
| 6,583,408 | B2 | 6/2003 | Smith et al. | |
| 6,603,118 | B2 | 8/2003 | Ellson et al. | |
| 6,762,025 | B2 * | 7/2004 | Cubicciotti | 435/6.12 |
| 6,803,565 | B2 | 10/2004 | Smith et al. | |

(Continued)

FOREIGN PATENT DOCUMENTS

| | | |
|---|---|---|
| WO | 02/071051 | 9/2002 |
| WO | 2007/128045 | 11/2007 |
| WO | 2011/023949 | 3/2011 |

OTHER PUBLICATIONS

Ju, J.Y., et al., Sensors and Actuators A: Physical, 2008, 145: p. 437-441.

(Continued)

*Primary Examiner* — Nikita Wells
(74) *Attorney, Agent, or Firm* — McDonnell Boehnen Hulbert & Berghoff LLP

(57) ABSTRACT

The present invention relates generally to mass spectrometry. The present invention relates more particularly to methods and systems for use in mass spectrometric identification of a variety of analytes, including high molecular weight species such as proteins. One embodiment of the invention is a method for analyzing an analyte. The method includes nebulizing a suspension of the analyte in a solvent with a surface acoustic wave transducer; and performing mass spectrometry on the nebulized suspension. The surface acoustic wave transducer can be used, for example, to transfer non-volatile peptides and proteins (as well as other analyztes, such as oligonucleotides and polymers) to the gas phase at atmospheric pressure. Nebulization using surface acoustic waves can be conducted in a discontinuous or pulsed mode, similar to that used in MALDI, or in a continuous mode, as in ESI.

27 Claims, 18 Drawing Sheets

U.S. PATENT DOCUMENTS

| | | | | |
|---|---|---|---|---|
| 6,831,724 | B2 | 12/2004 | Ohta et al. | |
| 6,855,925 | B2 | 2/2005 | Ellson et al. | |
| 6,867,415 | B2 | 3/2005 | Hughey et al. | |
| 6,881,586 | B2 | 4/2005 | Hutchens et al. | |
| 7,633,206 | B2 | 12/2009 | Sndle et al. | |
| 7,667,196 | B2 | 2/2010 | Schurenberg et al. | |
| 7,704,743 | B2 * | 4/2010 | Fedorov et al. | 435/461 |
| 7,863,560 | B2 | 1/2011 | Schaumloffel et al. | |
| 2006/0223185 | A1 | 10/2006 | Fedorov et al. | |

OTHER PUBLICATIONS

Bennes, J. et al., Applied Surface Science, 2008. 255(5): p. 1796-1800.

Takano, N., et al., Journal of Micromechanics and Microengineering, 2006. 16(8): p. 1606-1613.

Delamarche, E. et al., Advanced Materials, 2005. 17(24): p. 2911-2933.

Wu, S. et al., J Am Soc Mass Spectrom. Jun. 2006;17(6):772-9.

Hawkridge A.M. et al., Anal Chem. Jul. 15, 2004;76(14):4118-22.

Shaffer, S.A. et al., Anal Chem. Oct. 1, 1998;70(19):4111-9.

Shaffer, S.A. et al., Anal Chem. Aug. 1, 1999;71(15):2957-64.

Shaffer, S.A., Rapid Communications in Mass Spectrometry, 1997, 11, 1813-1817.

Kim, T. et al., Anal Chem. Sep. 1, 2001;73(17):4162-70.

Tang, K. et al., Anal Chem. Oct. 15, 2002;74(20):5431-7.

Page, J.S. et al., J Am Soc Mass Spectrom. Feb. 2005;16(2):244-53.

Page J.S. et al., Anal Chem. Mar. 1, 2008;80(5):1800-5.

Kelly, R.T. et al., Mass Spectrom Rev. Mar.-Apr. 2010, 29(2): 294-312.

Yeo, L.Y. And J.R. Friend, Biomicrofluidics, 2009. 3(1): p. 12002.

Wu, T.T. et al., Journal of Physics D-Applied Physics, 2005. 38(16): p. 2986-2994.

Erickson, D. and Li, D., Analytica Chimica Acta 507 (2004) 11-26.

Djafari-Rouhani, B et al., Phononics and Nanostructures—Fundamentals and Applications, vol. 6, Apr. 2008, pp. 32-37.

Mohammadi, S et al, Electronics Letters, vol. 43, 2007, pp. 898-899.

Mohammadi, S et al., Applied Physics Letters, vol. 92, Jun. 2008, pp. 221905-3.

Wu, T.T. et al., Z. Kristallogr. 220, 841-847 (2005).

Kuo, C et al., J. Phys. D: Appl. Phys. 37, 2155-2159 (2004).

Kuo, N. K. et al., Frequency Control Symposium, 2009 Joint with the 22nd European Frequency and Time forum. IEEE International, 10-13 (2009), doi:10.1109/FREQ.2009.5168133.

Laude, V et al., Ultrasonics Symposium, 2004 IEEE, 2004, pp. 1046-1049 vol. 2.

Pennec, Y et al., Applied Physics Letters, vol. 87, Dec. 2005, pp. 261912-3.

Olsson III, R.N. et al., Sensors and Actuators A: Physical, vol. 145-146, Jul. 2008, pp. 87-93.

Guenneau, S. et al., New Journal of Physics, vol. 9, Nov. 2007, pp. 1-18.

Benchabane, S. et al., Phononic Crystal Materials and Devices III, Strasbourg, France: SPIE, 2006, pp. 618216-13.

R. Wilson et al., "Phononic crystal structures for acoustically driven microfluidic applications," Lab. Chip., electronic publication dated Nov. 8 2010, available at http://pubs.rsc.org/en/Content/ArticleLanding/2011/LC/c0lc00234h.

Yi, E.C., et al., Rapid Commun. Mass Spectrom. 2003, 17, 2093-2098.

Scherl, A., et al., J. Am. Soc. Mass Spectrom. 2008, 19, 891-901.

* cited by examiner

A: Water (45 2 )
B: 1:1 MeOH/water (20 1 )
C: 10 μM GluFib in 1:1 MeOH/Water with 1% formic acid (25 2 )

a. 1177.673 ~ LAtri; 1 HPO3
b. 1323.888 ~ LAtetra; 1 HPO3
c. 1403.849 ~ LAtetra; 2 HPO3
d. 1454.947 ~ LAtetra; 1 HPO3; 1 Ara4N
e. 1506.068 ~ LApenta(C12); 1 HPO3
f. 1520.883 ~ LAtetra(C13(3-OH)); 2 HPO3; 1 Ara4N
g. 1534.898 ~ LAtetra; 2 HPO3; 1 Ara4N
h. 1586.006 ~ LApenta(C12); 2 HPO3
i. 1666.001 ~ LAtetra; 2 HPO3; 2 Ara4N
j. 1717.055 ~ LApenta(C12); 2 HPO3; 1 Ara4N
k. 1822.213 ~ LAhexa(C12;C16;1); 2 HPO3 a. 766.9522
b. 832.4815
c. 923.5677
d. 1210.7428 - LAtri; 1 HPO3; 1 Ara4N
e. 1403.8518 ~ LAtetra; 2 HPO3
f. 1454.9502 ~ LAtetra; 1 HPO3; 1 Ara4N
g. 1534.9136 ~ LAtetra; 2 HPO3; 1 Ara4N
h. 1665.9773 ~ LAtetra; 2 HPO3; 2 Ara4N
i. 1717.0863 ~ LApenta(C12); 2 HPO3; 1 Ara4N
j. 1848.1541 ~ LApenta(C12); 2 HPO3; 1 Ara4N

METHODS AND SYSTEMS FOR MASS SPECTROMETRY

CROSS-REFERENCE TO RELATED APPLICATIONS

This application is a continuation-in-part of International Patent Application no. PCT/US2010/56724, filed Nov. 15, 2010, which claims the priority under 35 U.S.C. §119(e) of U.S. Provisional Patent Application Ser. No. 61/261,198, filed Nov. 13, 2009, each of which is hereby incorporated by reference in its entirety. This application also claims the priority under 35 U.S.C. §119(e) of U.S. Provisional Patent Application Ser. No. 61/413,867, filed Nov. 15, 2010, which is hereby incorporated by reference in its entirety.

BACKGROUND OF THE INVENTION

1. Field of the Invention

The present invention relates generally to mass spectrometry. The present invention relates more particularly to methods and systems for use in mass spectrometric identification of a variety of analytes, including high molecular weight species such as proteins and low molecular weight compounds like peptides, glycolipids and polyphenols.

2. Technical Background

In the field of proteomics and metabolomics, there exists a constant concern regarding the amount of sample available for analysis. Unlike genomics, in which samples may be amplified via polymerase chain reaction, in proteomics, the investigator is limited to the sample at hand. Accordingly, research has turned to the field of miniaturization technologies that enable the reduction of sample volume, thereby minimizing sampling loss in the handling of proteins and peptides. For example, minature fluid handling (microfluidic) systems have been built on planar substrates. Such so-called "lab-on-a-chip" systems have focused on small-scall mimics of traditional protein purification and separation methods, including the integration of affinity capture and capillary chromatography methodologies on the chip. The integration of functionalized microchannels and chemical reaction chambers that mimic protein/peptide fractionation by affinity capture or chromatographic separation to process peptides and proteins has become important in the desire to carry out single cell analysis.

Within the field of proteomics, mass spectrometry is a useful tool for protein identification and analysis. Accordingly, it is useful to interface lab-on-a-chip systems with mass spectrometers. Electrospray ionization (ESI) is a conventional method for transferring non-volatile compounds such as peptides and proteins to the gas phase for mass spectrometric detection. ESI is often used to couple real-time separation techiques (e.g., HPLC) with mass spectrometry. ESI can be advantaged in that it can produce precursor ions with higher order charge states (e.g., $[M+nH]^{n+}$, where n>1) in order to provide more readily interpretable peptide tandem mass spectra, and thus allow peptide sequence to be assigned de novo or via a database search engine. However, ESI is disadvantaged in that it requires a capillary or nozzle for ionization. Such structures can be difficult to repeatably reproduce; accordingly, device-to-device variation can be significant. In turn, the conditions necessary to get a "Taylor cone" jet-and-plume structure desirable for ESI can vary significantly across devices. Moreover, ESI can be a relatively high-energy ionization process, and can therefore cause an undesired level of parent ion decomposition.

Matrix-assisted laser desorption ionization (MALDI) is another popular method transfer of peptides and proteins to the gas phase for mass spectrometry. Compared to ESI, MALDI is a "softer" ionization technique, generating primarily $[M+H]^+$ ions. Moreover, where ESI generates ions continuously, MALDI is a pulsed technique that can allow separation to be decoupled from ionization. This decoupling can provide the opportunity to repeatedly re-examine a sample (e.g., to interrogate the evolution of a sample over time). MALDI, however, requires a matrix (often benzoic acid derivatives such as sinpainic acid), and that matrix provides contamination of the resulting mass spectrum at low m/z.

There remains a need for mass spectroscopy ionization techniques that address one or more of these deficiencies.

SUMMARY OF THE INVENTION

One aspect of the invention is a method for analyzing an analyte. The method includes nebulizing a suspension of the analyte in a solvent with a surface acoustic wave transducer to provide nebulized suspension; and performing mass spectrometry on the nebulized suspension Another aspect of the invention is an analytical system for analyzing an analyte provided as a suspension in a solvent. The analytical system includes a mass spectrometer having an input; and a surface acoustic wave transducer operatively coupled to the mass spectrometer, such that when the surface acoustic wave transducer is used to nebulize the suspension to provide nebulized suspension, at least some of the nebulized suspension enters the input of the mass spectrometer.

In certain aspects of the invention, the surface acoustic wave transducer is operatively coupled to an array of scattering elements that guide the acoustic radiation emitting from the surface acoustic wave transducer. The array of scattering elements can, for example, form a phononic bandgap structure.

Certain of the various aspects and embodiments described herein can result in any of a number of advantages. For example, use of a surface acoustic wave transducer can provide pulsed nebulization from the surface of a chip, allowing separation to be decoupled from analysis, as described above with respect to MALDI. Unlike MALDI, the resulting mass spectra are not contaminated with matrix ions at low m/z (i.e., ratio of mass to charge). Moreover, the surface acoustic wave-based methods described herein can provide "softer" ionization as compared to ESI, and therefore can result in relatively more parent ions (single and multiply-ionized), allowing for more useful mass spectral data for proteins and peptides. Moreover, the methods and systems of the present invention do not require a capillary or nozzle, and the corresponding Taylor cone jet-spray pattern, and therefore can be made repeatably device-to-device. In certain embodiments, there is also no need for a fixed point charge, as in ESI, that can result in electrochemical oxidation or dissociation of covalent or noncovalent bonds of the analyte. Moreover, the methods can be coupled with lab-on-a-chip devices in order to provide chemical analysis after a separation, purification, or reaction performed thereon. Other advantages according to certain aspects and embodiments of the invention will be apparent to the person of skill in the art in view of the present disclosure.

The invention will be further described with reference to embodiments depicted the appended figures. It will be appreciated that elements in the figures are illustrated for simplicity and clarity and have not necessarily been drawn to scale. For example, the dimensions of some of the elements in the figures may be exaggerated relative to other elements to help to improve understanding of embodiments of the invention.

BRIEF DESCRIPTION OF THE DRAWINGS

The accompanying drawings are not necessarily to scale, and sizes of various elements can be distorted for clarity.

DETAILED DESCRIPTION OF THE INVENTION

Figure 1:
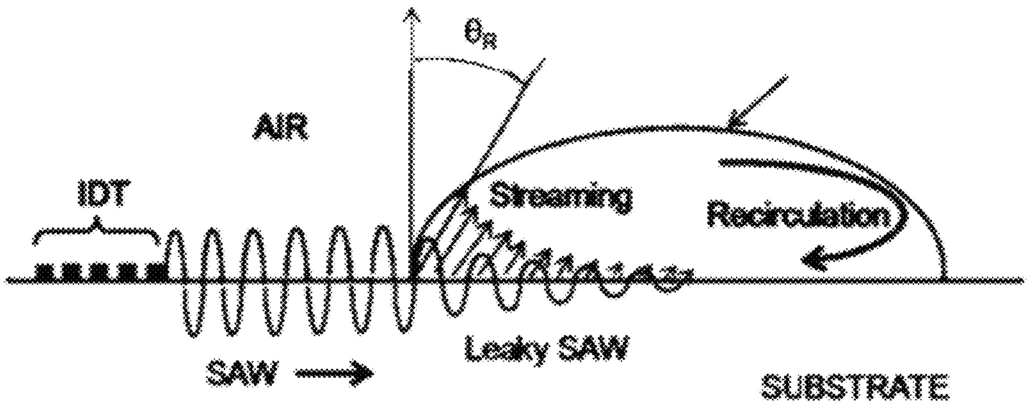
FIG. 1 is a schematic depticion of surface acoustic wave transduction.

One embodiment of the invention is a method for analyzing an analyte. The method includes nebulizing a suspension of the analyte in a solvent with a surface acoustic wave transducer; and performing mass spectrometry on the nebulized suspension. The surface acoustic wave transducer can be used, for example, to transfer non-volatile peptides and proteins (as well as other analyztes, such as oligonucleotides and polymers) to the gas phase at atmospheric pressure. Nebulization using surface acoustic waves can be conducted in a discontinuous or pulsed mode, similar to that used in MALDI, or in a continuous mode, as in ESI. The nebulized plume can last, for example, on the order of minutes in continuous mode, and can produce multiply charged precursor ions with a charge state distribution shifted to higher m/z ratios compared to an identical sample produced by ESI. In both continous and pulsed sampling modes, the quality of precursor ion scans and tandem mass spectra of analyte can be consistent across plume lifetime. Moreover, unlike MALDI mass spectra which are typically contaminated with matrix ions at low m/z, the surface acoustic wave-generated spectra have substantially no such interference. The surface acoustic wave methods and devices described herein can be performed without capillaries or nozzles extending from the surface of the surface acoustic wave device. Surface acoustic wave technology is also amenable to an array-based format, in which multiple sample areas arrayed on a chip can be nebulized sequentially or simultaneously.

A surface acoustic wave is an acoustic wave travelling along the surface of a material exhibiting elasticity, with an amplitude that typically decays exponentially with depth into the substrate. A surface acoustic wave device typically uses interdigitating electrodes on a substrate to convert an electrical signal to an acoustic wave, using the piezoelectric properties of the substrate. Surface acoustic waves are used in microfluidic devices; owing to the mismatch of sound velocities between the surface acoustic wave substrate and the fluid, surface acoustic waves can be efficiently transferred into the fluid, to create significant inertial force and fluid velocities. This mechanism can be exploited to drive fluid actions such as pumping, mixing, jetting and nebulization. Advantageously, and in contrast with many other microfluidics techniques, surface acoustic wave-based microfluidic techniques do not require pressure-driven pumps and their associated dead volumes. Moreover, unlike electrokinetics-based techniques, the sample need not be in contact with the electrodes to drive the sample flow. Surface acoustic wave-based microfluidic techniques have been used to perform mixing within channels, heating, droplet movement and delivery to or from a microfluidic port. Moreover, surface acoustic wave nebulization has been used to generate small droplets (e.g., 5-10 nm diameter) for assisting with synthesis of polymeric nanoparticles, to nebulize protein samples for writing protein arrays, and to generate monodispserse aerosols and nanoparticles for drug delivery.

While not intending to be bound by theory, the inventors note that surface acoustic wave transduction involves propagation of Rayleigh waves across the surface of the transducer. FIG. 1 is a schematic depiction of surface acoustic wave transduction, showing interdigitated electrodes (IDT) generating a surface acoustic wave (SAW) on a substrate. If a drop of fluid is placed on the surface, the mechanical wave will refract (with minimal reflection) into the drop. The extent of refraction is dependent on the contact angle of the drop with the transducer surface. For example, the contact angle of water with lithium niobate is about 30°. Different solvents and suspensions with different solutes (e.g., proteins and lipids) will have different contact angles owing to differing surface tensions; accordingly, the extent of surface acoustic wave propagation will differ in such fluids. Once refracted into the drop, the acoustic wave can reflect, driving fluid streaming within the droplet. If the energy of the incoming surface acoustic wave is increased, a number of effects can occur. Most importantly with respect to the methods and systems described herein, at appropriate surface acoustic wave energies, nebulization occurs. In such a process, the acoustic energy causes the drop to increase its wetting of the surface (i.e., contact angle tending closer to 0°). The energy is dissipated into the wetted drop as a series of surface waves, which cause the fluid to oscillate at high rates. The inertia of the fluid becomes too great, causing liquid fractionation, resulting in emission of droplets on the order of femtoliters in volume in which droplets of fluid are created and emitted from the surface at a pitch of several microns. The pitch is related to the wavelength of sound in the fluid, which is a function of viscosity and density. When viewed with a high-speed camera, the surface appears to "boil." Depending on the incoming surface acoustic wave, two other processes are possible. At lower energies, the drop can simply move along the surface. At higher power densities, ejection of picoliter sized droplets can occur as a consequence of a high degree of localization of energy. Ejection is generally observed from a single location within the drop, rather than across the drop.

Figure 2:
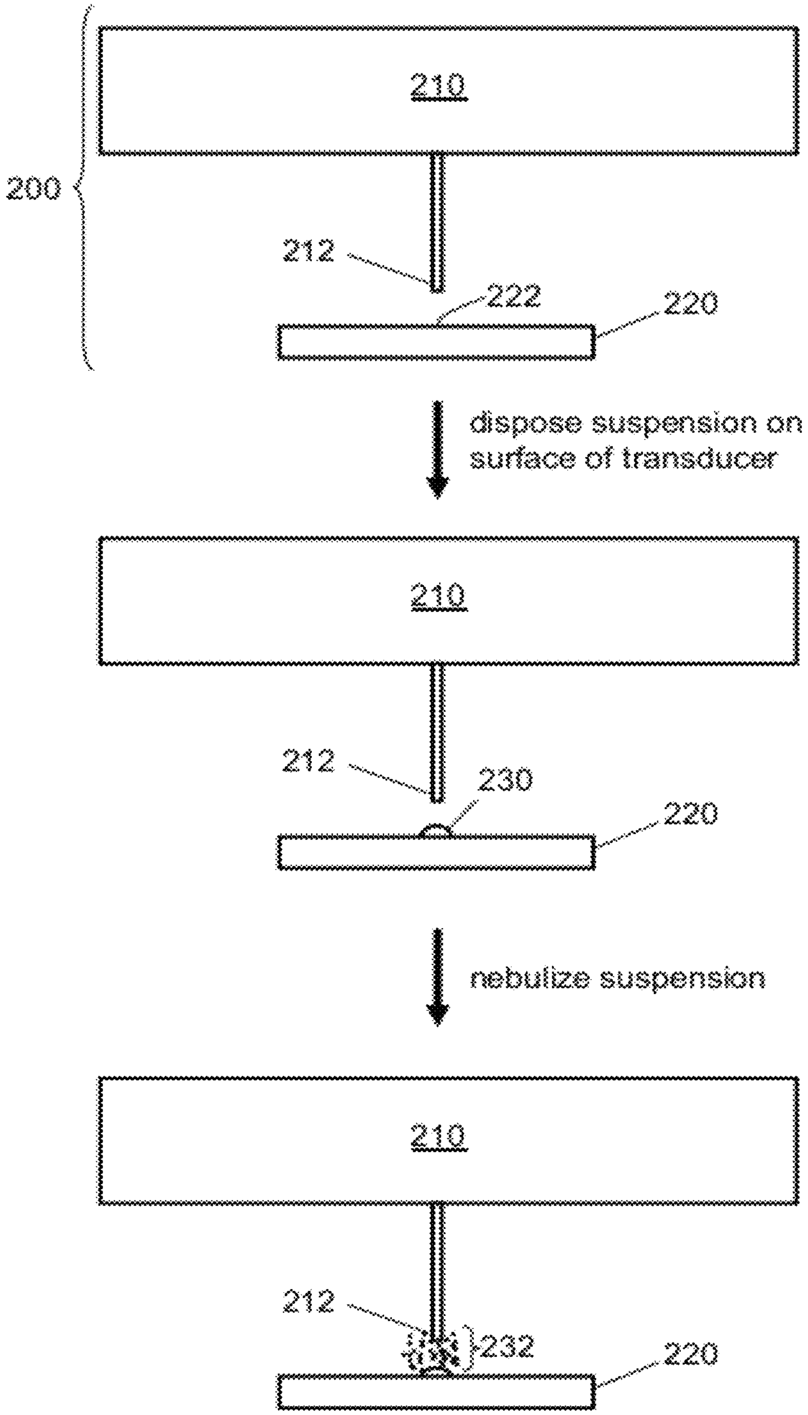
FIG. 2 is a schematic view of an analytical system for analyzing an analyte via mass spectrometry according to one embodiment of the invention; and its use in performing a method for analyzing an analyte according to one embodiment of the invention.

One embodiment of a system for use in performing such a method; and its use in performing a method according to one embodiment of the invention, are shown in schematic view in FIG. 2. Analytical system 200 includes a mass spectrometer 210 having an input (here, capillary 212). In certain embodiments, the inlet can be a so-called atmosphereic pressure ionization inlet, for example, as provided for use with Thermo, Bruker, Waters and Agilent mass spectrometers, among others. A surface acoustic wave transducer 220 is operatively coupled to the mass spectrometer 210, so that when the surface acoustic wave transducer is used to nebulize the suspension, at least some of the nebulized suspension enters the input of the mass spectrometer. Accordingly, in an embodiment of a method according to the invention, a suspension 230 of the analyte in a solvent is provided to an active surface 222 of the surface acoustic wave transducer 220. The surface acoustic wave tranducer 220 is activated (e.g., by creating an oscillating electrical potential between interdigitating electrodes, as described below), creating acoustic energy (as a surface acoustic wave) that nebulizes the suspension 230 into small droplets. Mass spectrometry is performed on the nebulized suspension 232 that enters the input of the mass spectrometer.

Figure 3:
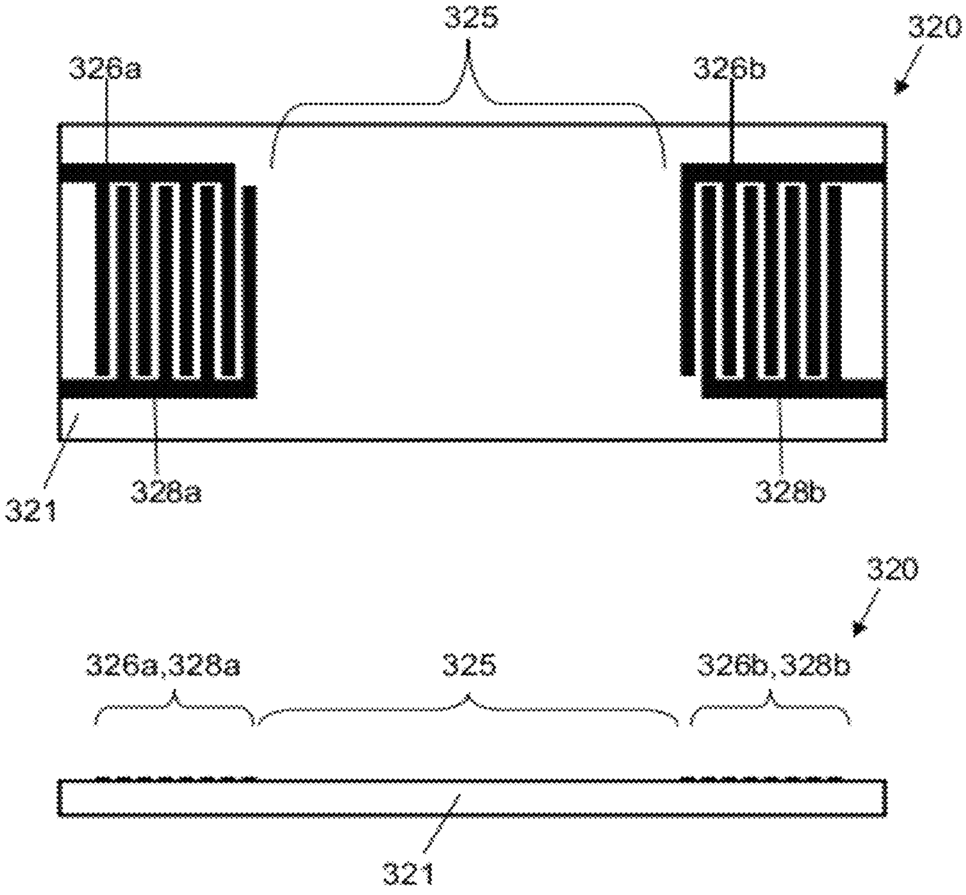
FIG. 3 is a schematic top view and schematic cross-sectional view of a surface acoustic wave transducer according to one embodiment of the invention.

One embodiment of a surface acoustic wave transducer is shown in schematic top view and in schematic cross-sectional view in FIG. 3. Surface acoustic wave transducer 320 includes a substrate 321, with two sets of interdigitating electrodes (326*a* and 328*a*; and 326*b* and 328*b*) formed on a surface 322 thereof. Between the sets of electrodes is an aperture 325. The substrate can be formed, for example, from lithium niobate. Other piezoelectric materials, such as quartz, lead zirconate titanate, zinc oxide, lithium tantalate, and lanthanum gallium silicate, can also be used. The interdigitating electrodes can have, for example, a pitch in the range of about 200 μm to about 600 μm, electrode widths in the range of about 20 μm to about 150 μm. In certain embodiments, the aperture is in the range of about 1 mm to about 100 mm. Of course, based on the present disclosure the person of skill in the art can modify the device attributes outside of these ranges in order to provide a surface acoustic wave transducer that can be driven to nebulize the suspension. For example, different electrode designs and aperture configurations can be used. Moreover, more or less than two sets of electrodes can be used.

As noted above, in one embodiment, the nebulization is performed continuously. In another embodiment, the nebulization is performed discontinuously, for example, in pulses or steps over time. For example, the nebulization/analysis steps can be repeated over the course of hours or even days, allowing a sample to be interrogated for evolution over time, as is conventional in MALDI techniques. Unlike in MALDI techniques, however, the data generated by the methods described herein are not contaminated with matrix ions at low m/z.

The nebulization can provide nebulized suspension having a variety of droplet sizes. As the person of skill in the art would appreciate, nebulization will result in a distribution of droplet sizes. The average droplet size of the nebulized mode can be, for example, in the range of about 0.1 μm to about 50 μm, and in some embodiments, about 3 μm to about 20 μm. As described in more detail below, the frequency of the surface acoustic wave can be used to control the droplet size, with higher frequencies resulting in smaller average droplet size. For example, Ju, J. Y., et al., *Sensors and Actuators A: Physical,* 2008, 145: p. 437-441, which is hereby incorporated herein by reference in its entirety, describes experiments showing decreasing nebulized droplet size as a function of frequency (50, 75 and 100 MHz driving frequencies yielding droplet sizes of 5.7, 4.4 and 2.7 μm, respectively). The droplet size will also depend on the identity of the suspension (e.g., both the solvents and the solutes can have an effect). The person of skill in the art can, based on the present disclosure, select surface acoustic wave tranducer conditions to provide the desired droplet size for the suspension to be analyzed.

Figure 4:
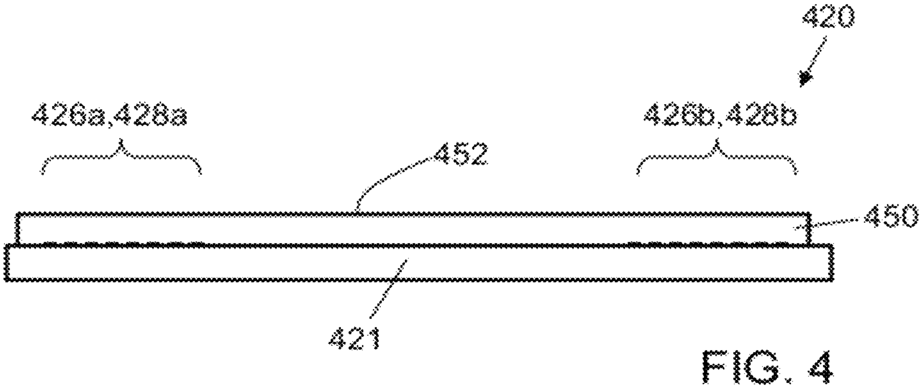
FIG. 4 is a schematic cross-sectional view of a surface acoustic wave transducer including a superstrate according to one embodiment of the invention.

In certain embodiments, surface acoustic wave transducer can include a superstrate disposed on the piezoelectric substrate. One embodiment is shown in schematic cross-sectional view in FIG. 4. Surface acoustic wave tranducer 420 includes piezoelectric substrate 421 (and electrodes 426, 428, with superstrate 450 disposed thereon. In this embodiment, the superstrate is shown as being roughly the same size as substrate. In other embodiments, the superstrate can be larger, or smaller than the substrate. In fact, the superstrate can be part of a larger microfluidic device; for example, a channel can lead from a separation or reaction region of the device to the region that acts as the superstrate of the transducer. The superstrate can be formed from a variety of materials, for example, from glass, silica, silicon, semiconductor materials, or polymer. The superstrate can be placed on the substrate, with a fluid layer (e.g., water) between the two for effective transfer of energy to the superstrate. In use, the surface acoustic wave of the piezoelectric substrate will be coupled into the superstrate, such that the suspension can be placed on the surface 452 of the superstrate 450 and nebulized therefrom. Accordingly, the superstrate can provide a disposable or easily cleanable surface, so the more difficult-to-fabricate piezoelectric substrate/electrode structures can have a longer service life. The superstrate can be formed from relatively simple standard microfabrication methods, such as photolithography, etching, and microembossing. The person of skill in the art will recognize that other techniques can be used to form the transducer.

In certain embodiments, the surface of the transducer (e.g., the surface of the superstrate) can have surface features such as ridges, channels, or surface coatings (e.g., organic-containing) or patterning to guide the movement and activity of liquid thereon. For example, in certain embodiments, the surface of the superstrate has an organically-modified silicate coating formed thereon. The organically-modified silicate coating can be a monolayer, or a multilayer, and can be formed using standard silane chemistry. The organically-modified silicate can be selected to provide a desired contact angle of the drop of suspension with the surface. For example, an organically modified silicate formed from trimethylchlorosilane and/or methyltrimethoxysilane can provide relatively large contact angles with aqueous solutions. An organically modified silicate made with a highly fluorinated alkylsilane, such as perfluoro-1H,1H,2H,2H-octyltrichlorosilane, can provide increased contact angles even when the suspension includes an organic solvent. As described above, the nebulization of the suspension will depend on contact angle, so surface chemistry can be tuned to change the nebulization behavior. A clean glass surface (e.g., cleaned with strong base or strong oxidizing acid) can provide relatively low contact angles.

In one embodiment, the surface of the transducer (e.g., the surface of the superstrate) has regions of different wettability. Silane chemistry can be used to differently pattern the surface. For example, a clean glass or silicon superstrate can be photolithographically patterned, and treated with a desired chlorosilane in a solvent that does not dissolve the photoresist (e.g. hexanes). The photoresist can be removed, and optionally the exposed area can be reacted with another silane. Such patterning can, for example, form a wettable area for the suspension, surrounded by non-wettable areas, thus confining the drop of suspension, and therefore the nebulization to a defined area. For example, organic solvents typically used to extract lipids, such as methanol and chloroform, tend to spread out over the surface of the transducer due to a lack of surface tension, resulting in inconsistency in the origin of nebulized plume formation. Accordingly, in certain embodiments, a hydrophilic surface region can be created on the surface of the transducer, surrounded by a hydrophobic surface region. The hydrophilic region can be, for example, bare oxide. The hydrophobic region can be formed from a silane as described above, for example, a long chain alkyl silane, or a highly fluorinated alkyl silane. While the suspension may not necessarily bead up at the interface between the hydrophobic region and the hydrophilic region (for example, like water would), it will tend to remain confined to the hydrophilic region long enough for actuation to be performed. A plurality of wettable areas can be formed on the surface, for example, to provide for a plurality of areas from which to nebulizer a suspension. The wettable areas can be aligned with other features of the device, for example, any channels or features that couple a microfluidic system to the transducer.

Numerous other methods for carrying out surface modification are known to the person of skill in the art, such as deposition from liquid or vapor, stamping, and direct photolithographic masks. See, e.g., Bennes, J. et al., *Applied Surface Science,* 2008. 255(5): p. 1796-1800; Takano, N., et al., *Journal of Micromechanics and Microengineering,* 2006. 16(8): p. 1606-1613; and Delamarche, E. et al., *Advanced Materials,* 2005. 17(24): p. 2911-2933, each of which is hereby incorporated herein by reference in its entirety. Notably, the surface modifications described above with respect to the superstrate can also be applied directly to a piezoelectric substrate.

Notably, in various embodiments of the invention, the nebulization of the suspension is from a substantially flat surface. In such embodiments, no additional capillaries, nozzles, channels or electrodes are necessary. Advantageously, such embodiments do not suffer from the high surface area-to-volume ratios, and the adventitious material losses (e.g., non-specific adsorption of proteins and biofouling by lipids) associated therewith. Moreover, clogging of narrow nozzles or capillaries by materials such as lipids is not a concern when nebulizing from a substantially flat surface. Of course, features such as channels can be used to deliver the suspension to the substantially flat surface for nebulization.

In certain embodiments, the surface of the transducer is not at an electrical potential substantially different from ground. In ESI processes, the capillary is at a high voltage, which can promote analyte oxidation and thus mask the ability to determine oxidation of analytes in vivo. For example, in protein identification, ESI can oxidize methionyl, tryptophanyl and tyrosyl residues, complicating peptide database searches by the addition of additional differential modifications, and confounding attempts to measure differences in protein quantities between samples. Sample oxidation has also been widely observed for the DESI process. Accordingly, it can be desirable to maintain the surface of the transducer at a relatively low voltage (e.g., not substantially different from ground), to avoid oxidation.

In other embodiments, a potential (e.g., greater than 10 V from ground, greater than 100 V from ground, or even greater than 1000 V from ground, e.g., 5 kV) is applied to the surface of the transducer. The added voltage increases the charge that the liquid carries as it is nebulized. This increases the attraction between the vapor and the inlet of the mass spectrometer, pulling more of the vapor inside the instrument, thereby leading to better detection of the analyte. This added potential can be applied, for example, by an electrode provided as part of the surface acoustic wave transducer (e.g., disposed at or underneath the surface from which the suspension is nebulized).

The mass spectrometry can be performed using a mass spectrometer. Any suitable mass spectrometer for mass spectrometric analysis of the analyte can be used. For example, depending on the analyte and the desired analysis to be performed, the mass spectrometer can be based on a sector field mass analyzer, a time of flight mass analyzer, a quadrupole mass analyzer, a quadrupole ion trap, a linear quadrupole ion trap, an orbitrap, or a Fourier transform ion cyclotron resonance mass analyzer. Of course, as would be apparent to the person of skill in the art in light of the present disclosure, other types of mass spectrometric systems can be used in practicing the methods and constructing the systems described herein.

In certain embodiments, the nebulized suspension is directed to the input of the mass spectrometer, for example, using a carrier gas, a stream of nebulized solvent, or a combination thereof. In certain embodiments, the angle and/or distance of nebulization from the surface acoustic wave transducer is low enough that it is desirable to more actively convey the nebulized suspension to the input of the mass spectrometer in order to provide a relatively larger amount of analyte to the mass spectral analysis. Accordingly, in certain embodiments of the systems described herein, a source of carrier gas or a source of a stream of nebulized solvent is included in the system, configured to direct an nebulized suspension from the surface acoustic wave tranducer to the input of the mass spectrometer. Of course, other methods can be used to more actively convey the nebulized suspension to the input of the mass spectrometer, and in some embodiments, the nebulization process itself will provide sufficient nebulized suspension to the mass spectrometer. The mass spectrometer can pull nebulized suspension into its input as a result of the imposed pull of the vacuum system and the electrical potential of the orifice. An electrical field (e.g., created by the potential of the orifice relative to ground) can help to attract the nebulized suspension to the input of the mass spectrometer. Moreover, the use of concave, curved capillary inlets can be more efficient than flat-fronted designs for ion capture and transfer. Wu, S. et al., *J Am Soc Mass Spectrom.* 2006 June; 17(6):772-9, which is hereby incorporated herein by reference in its entirety. The concave aspect of the capillary can also be lined with non-conductive anti-static materials to help facilitate ion entry to the mass spectrometer. Hawkridge A. M. et al., *Anal Chem.* 2004 Jul. 15; 76(14): 4118-22, which is hereby incorporated herein by reference in its entirety. Moreover, a shield or enclosure can be provided around the transducer in order to protect the nebulized suspension from being blown about by room air currents. In fact, gas dynamics (e.g., within an enclosure) can be used to sweep the nebulized suspension to the input of the mass spectrometer. Moreover, a multiple capillary inlet can be used to provide increased gas load to the mass spectrometer.

The nebulized suspension can be emitted from the surface of the surface acoustic wave transducer as a somewhat nebulous plume. Surface chemistry and phononic bandgap structures can be used to minimize the area of the surface from which the nebulized suspension is emitted, and to provide some directionality to the emission, in order to improve the capture of the by nebulized suspension by the inlet of the mass spectrometer. In certain embodiments, however, it can be desirable to provide additional focusing of the plume of nebulized suspension. Accordingly, in one embodiment, electrofocusing is used to improve the efficiency of the mass transfer from the nebulized suspension to the inlet of the mass spectrometer, for example, using an ion funnel. An ion funnel is an electrodynamic radiofrequency ion guide, and is known in the art to more efficiently capture ions entering the mass spectrometer. Certain embodiments of ion funnels include series of evenly-spaced stacked-ring electrodes. The diameters of the electrodes taper down to a relatively small exit aperture, which is coupled to the input of the mass spectrometer. Ions are confined in the plane parallel to the funnel axis by the application of RF fields (e.g., in the range of 700 kHz-1.4 MHz) applied through equal amplitude but opposite polarity on adjacent electrodes. Ions are moved through the device along the funnel axis from the wide end to the narrow end by co-application of a direct current field gradient. In use, the large acceptance aperture of the ion funnel can more efficiently capture the expanding plume of nebulized suspension, presenting them as a more focused collimated ion beam at the input of the mass spectrometer. Ion funnels are described in, for example, Shaffer, S. A. et al., *Anal Chem.* 1998 Oct. 1; 70(19):4111-9; Shaffer, S. A. et al., *Anal Chem.* 1999 Aug. 1; 71(15):2957-64; Shaffer, S. A., *Rapid Communications in Mass Spectrometry,* 1997, 11, 1813-1817; Kim, T. et al., *Anal Chem.* 2001 Sep. 1; 73(17):4162-70; Tang, K. et al., *Anal Chem.* 2002 Oct. 15; 74(20):5431-7; Page, J. S. et al., *J Am Soc Mass Spectrom.* 2005 February; 16(2):244-53; Page J. S. et al., *Anal Chem.* 2008 Mar. 1; 80(5):1800-5; Kelly, R. T. et al., *Mass Spectrom Rev.* 2010 March-April, 29(2): 294-312; and U.S. Pat. Nos. 6,107,628, 6,583,408, 6,831,724 and 6,803,565, each of which is hereby incorporated herein by reference in its entirety.

In certain embodiments, no additional ionization technique need be used. As the solvent is stripped from the analyte droplet, the analyte becomes ionized. In other embodiments, however, an additional ionization technique is used to assist in ionization. For example, ionization of the nebulized suspension can be assisted using known techniques such as ESI, ACPI (corona discharge), DESI (desorption electrospray ionization), and LAESI (laser ablation electrospray ionization). Moreover, application of a voltage to the suspension on the transducer, as described above, can also provide additional assistance to ionization.

Figure 5:
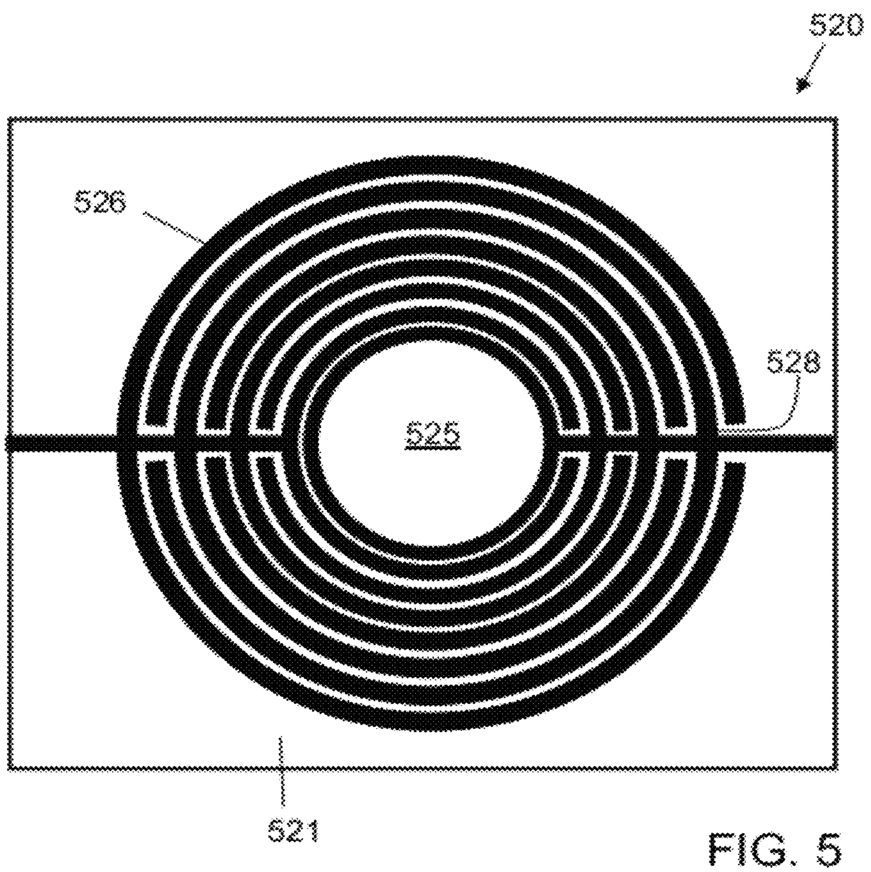
FIG. 5 is a schematic top view of a surface acoustic wave transducer having concentric electrodes.

In certain embodiments, the surface acoustic wave electrodes are concentrically interdigitated. Propagation of a surface acoustic wave on a linear electrode can lead to inconsistent locations for nebulization, because the travelling wave can dislocate the drop. Yeo, L. Y. and J. R. Friend, *Biomicrofluidics,* 2009. 3(1): p. 12002, which is hereby incorporated herein by reference in its entirety. This feature can be harnessed to control droplet movement, but in many embodiments can be beyond the level of complexity desired for a simple sample analysis system. Focused surface acoustic wave devices, such as those described in Wu, T. T. et al., *Journal of Physics D-Applied Physics,* 2005. 38(16): p. 2986-2994, which is hereby incorporated herein by reference in its entirety. An example of such a device is shown in schematic top view in FIG. 5. Surface acoustic wave transducer 520 includes a piezoelectric substrate 521, with two sets of interdigitating electrodes 526 and 528 formed thereon in a concentric circular pattern, defining aperture 525. Such devices can help to keep the droplet centered (e.g., in the center of the "bullseye"). Moreover, such focused surface acoustic wave devices can have more power than devices based on linear electrodes, potentially making them more efficient at nebulization. The electrodes are shown in a circular pattern in FIG. 5; other configurations can be used. Of course, in other embodiments, a linearly interdigitated electrode configuration is used, optionally with surface patterning (as described below) to provide a consistent location of drop nebulization.

The methods and systems described herein can provide relatively "soft" ionization of the analyte as compared to other techniques such as ESI. For example, in one embodiment, the mass spectral analysis results in the detection of an $[M+H]^+$ or $[M-H]^-$ peak. Advantageously, and in contrast to methods such as those based on ESI, the methods described herein can provide significant amounts of singly protonated or deprotonated analyte, thereby yielding a significant and detectable $[M+H]^+$ or $[M-H]^-$ peak. The $[M+H]^+$ or $[M-H]^-$ peak can be of, for example, at least 10% of the intensity of the $[M+2H]^+$ or $[M-2H]^{2-}$ peak. Similarly, in some embodiments, the $[M+H]^+$ or $[M-H]^-$ peak is of at least 5%, or even of at least 10% of the intensity of the largest detected decomposition ion peak. Of course, in other embodiments, the base peak will be an $[M+nH]^{n+}$ or an $[M-nH]^{n-}$ peak. While many of the experiments described herein are performed on positive ions and run in positive mode on the mass spectrometer, the person of skill in the art will recognize that the techniques can also be modified for use with negative ions and negative mode operation of the mass spectrometer, for example as described below with respect to Example 5.

As the person of skill in the art will appreciate, during the performance of the mass spectrometry of the nebulized suspension, preferably substantially all of the solvent of the suspension is removed, such that substantially no (or, at most, relatively little) solvent ions are detected in the mass spectra. The person of skill in the art can adjust the mass spectrometry settings (e.g., inlet temperature) to avoid an undesired level of solvent detection.

A wide variety of analytes can be analyzed using the methods and systems described herein. In one embodiment, for example, the analyte is non-volatile. In some embodiments, the analyte can have molecular weight greater than about 500 Da, greater than about 1000 Da, or even greater than about 2000 Da. There is no general upper limit other than that imposed by the mass spectrometer. Accordingly, analytes having molecular weights up to about 100 kDa, up to about 500 kDa, up to about 1000 kDa and even up to about 5000 kDa can be analyzed using the methods and systems described herein. Of course, smaller analytes can be analyzed using the methods and systems described; for example in one embodiment, the analyte has a molecular weight in the range of about 50 Da to about 500 Da. In such embodiments, the methods and systems described herein can be advantaged, in that they can provide soft ionization without matrix interference at low m/z.

In certain embodiments, the analyte is a biomolecule. For example, in certain embodiments, the analyte is a peptide or a protein. As noted above, peptides and proteins for analysis are often available in only very small amounts. In certain embodiments, the methods and systems described herein can operate on such very small amounts with relatively little material loss on device surfaces to provide meaningful analytic data. Of course, in other embodiments, other analytes can be analyzed, such as metabolites, small organic molecules, oligonucleotides, polysaccharides, glycoproteins, lipids, carbohydrates, and other biopolymers. The analyte can be from a biologic source, or in other embodiments can be from a non-biologic source (e.g., synthetic in nature).

Of course, the methods and systems described herein can also be useful for analyzing other types of analytes. For example, other organic materials such as polymers, oligomers, and small organic molecules can be analyzed using the methods and systems described herein. Inorganic materials can also be analyzed using the methods and systems described herein.

A wide variety of solvents can be used in practicing the methods described herein. The person of skill in the art will understand that the choice of solvent will depend on the analyte and the mass spectrometr used, and that the choice of solvent will impact the conditions used for the surface acoustic wave tranducer and the mass spectrometer. In certain embodiments, the solvent has a boiling point less than about 150° C., less than about 120° C., or even less than about 105° C. The solvent can be, for example, water, a lower alcohol (e.g., methanol, ethanol, or a propanol), or a mixture thereof. Of course, depending on the analyte, other solvents can also be used (e.g., volatile organic solvents for the analysis of polymer materials). As used herein, in the "suspension" in the solvent, the analyte can be fully dissolved (i.e., to form a solution), or merely suspended, or a combination thereof (e.g., partially dissolved and partially suspended). The analyte can be present in the suspension at a variety of concentrations. Notably, even low concentrations can be detected using the method and systems described herein. For example, in one embodiment, the analyte is present in the sample at a detectable concentration less than about 50 μM.

In certain embodiments, an acid or a base can be included in the suspsension, for example to provide a greater abundance of ions for mass spectral analysis. For example, in some embodiments, the suspension includes an acid. In such embodiments, the acid can be used to provide a greater abundance of positive ions (e.g., $[M+H]^+$) for mass spectral analysis. In one embodiment, the acid is formic acid. In other embodiments, the acid is a hydrohalic acid (e.g., HCl), or a carboxylic acid such as acetic acid. The acid can, for example, be provided at a concentration to yield a pH in the range of about 2 to about 5. For example, and as described in more detail below, in certain embodiments, the acid is formic acid, added to the suspension at a concentration of about 0.1 wt %. In such examples, the mass spectrometer can be run in positive mode, as would be apparent to the person of skill in the art.

In other embodiments, the suspension includes a base. In such embodiments, the base can be used to provide a greater abundance of negative ions (e.g., $[M-H]^-$) for mass spectral analysis. The base can be, for example, ammonium hydroxide. Of course, other bases (e.g., volatile bases such as amine bases) can be used. The base can, for example, be provided at a concentration to yield a pH in the range of about 5 to about 9. In such examples, the mass spectrometer can be run in negative mode, as would be apparent to the person of skill in the art.

Of course, in other embodiments, no acid or base is provided in the suspension. While the degree of ionization will be somewhat less, it can still be sufficient for mass spectral detection of the analyte.

In certain embodiments of the methods and systems described herein, the surface acoustic wave tranducer is operatively coupled to a microfluidic (e.g., "lab-on-a-chip") device. The microfluidic device can be used, for example, to perform a reaction, separation, and/or purification of the analyte, for example, before nebulization of the suspension. Of course, the microfluidic device can be coupled to the surface acoustic wave transducer to perform other functions. The surface acoustic wave transducer can be built on the same substrate as the microfluidic device, and merely couple thereto through one or more microfluidic channels. In other embodiments, the microfluidic device is disposed on top of the piezoelectric substrate, such that the region of the microfluidic device over the piezoelectric substrate forms a superstrate of the transducer.

A wide variety of microfluidic devices can be coupled to a surface acoustic wave transducer for mass spectrometric analysis. For example, in one embodiment, the microfluidic device is a so-called EWOD (electrowetting on dielectric) or DMF (digital microfluidic) device. In such devices, a sample can be moved along the surface of the device using the property of electrocapillarity (the modification of surface tension by applying an electric field). Other types of microfluidic devices that can be coupled to the surface acoustic wave transducer include capillary-based devices, thin layer chromatography, capillary electrophoresis, PCR devices, and microfluidic chemical reactors. Examples of microfluidic devices are generally described in Erickson, D. and Li, D., *Analytica Chimica Acta* 507 (2004) 11-26, which is hereby incorporated herein by reference in its entirety. Moreover, the device can provide for affinity capture and separation, for example as described in U.S. Pat. No. 6,881,586, which is hereby incorporated herein by reference in its entirety. Other devices can be coupled to the surface acoustic wave transducer. For example, in one embodiment, a microwave device can be coupled to the surface acoustic wave transducer, for example, for sample preparation.

In certain embodiments of the methods and systems described herein, multiple surface acoustic wave transducers are arrayed together, for example, in a monolithic device. Each such tranducer can be used, for example, to nebulize a different sample. Arrays of surface acoustic wave transducers can be used, for example, for multiplexing or interfacing with devices in which multiple samples are handled in parallel, such as microtiter plates and parallel microfluidic arrays. The arrayed transducers can, for example, resemble MALDI plates in functionality, allowing for the spotting of a plurality of samples, with sequential analysis thereof. For example, the array of transducers can be provided using an array of slanted reflectors, as described in U.S. Pat. No. 7,633,206, which is hereby incorporated herein by reference in its entirety. Such devices can provide a plurality of individually addressable (by different frequencies) spots from which a suspension can be nebulized. Advantageously, the slanted reflectors can be aligned with wettable areas defined by surface chemistry, as described above.

In various aspects of the invention, the surface acoustic wave transducer is operatively coupled to an array of scattering elements to guide (e.g., focus) the acoustic radiation to help control fluid movement and nebulization. For example, in certain embodiments, the scattering elements form a so-called acoustic (or phononic) band gap material (also known as a phononic (or sonic) crystal). Phononic band bap materials are so-called "metamaterials" that have a pattern of perturbation of elastic modulus, thereby providing a regular ordering of regions with a contrast in material stiffness. Such ordered arrays, which are often simple cubic or hexagonal close-packed 3D or 2D structures, scatter sound waves as a function of direction and/or frequency. Phononic bandgap structures can be formed, for example, as a series of pattern of structures with contrasting Young's moduli. For example, the materials can be solid material such as silica, glass, silicon or polymer with the higher Young's modulus; and a fluid such as air or liquid with the lower Young's modulus. Such structures can be formed, for example, by lithographically or by embossing.

Phononic bandgap materials can be used to shape or manipulate surface acoustic waves. For example, by designing appropriate geometries with an appropriate contrast in elastic modulus between constituent materials, stop-bands (or bandgaps) can be created that provide strongly reflecting interfaces for acoustic waves. For example, complete bandgaps (i.e., in which acoustic waves will not propagate) have been demonstrated for thin plate phononic crystals. See, e.g., Djafari-Rouhani, B et al., *Phononics and Nanostructures—Fundamentals and Applications*, vol. 6, April 2008, pp. 32-37; Mohammadi, S et al, *Electronics Letters*, vol. 43, 2007, pp. 898-899; Mohammadi, S et al., *Applied Physics Letters*, vol. 92, June 2008, pp. 221905-3; Wu, T. T. et al., *Z. Kristallogr.* 220, 841-847 (2005), each of which is hereby incorporated by reference herein in its entirety. For example, by etching a lattice with a depth of only half the lattice constant, an absolute bandgap can be produced. Accordingly, phononic bandgap structures have been used in the microelectronics and communications industry, for example, as filters or to modify acoustic dispersion, sonic lenses and wavelength multiplexers. See, e.g., Kuo, C et al., *J. Phys. D: Appl. Phys.* 37, 2155-2159 (2004); Kuo, N. K. et al., *Frequency Control Symposium,* 2009 *Joint with the* 22*nd European Frequency and Time forum. IEEE International,* 10-13 (2009), doi:10.1109/FREQ.2009.5168133; Laude, V et al., *Ultrasonics Symposium,* 2004 *IEEE,* 2004, pp. 1046-1049 Vol. 2; Pennec, Y et al., *Applied Physics Letters*, vol. 87, December 2005, pp. 261912-3; Olsson III, R. H. et al., *Sensors and Actuators A: Physical*, vol. 145-146, July 2008, pp. 87-93; Guenneau, S. et al., *New Journal of Physics*, vol. 9, November 2007, pp. 1-18; Benchabane, S. et al., *Phononic Crystal Materials and Devices III*, Strasbourg, France: SPIE, 2006, pp. 618216-13, each of which is hereby incorporated by reference herein in its entirety. The coupling of phononic crystal structures with microfluidic devices is described, for example, in R. Wilson et al., "Phononic crystal structures for acoustically driven microfluidic applications," *Lab. Chip.*, electronic publication dated 2010 Nov. 8, available at http://pubs.rsc.org/en/Content/ArticleLanding/2011/LC/c01c00234h, which is hereby incorporated herein by reference in its entirety.

Figure 22:
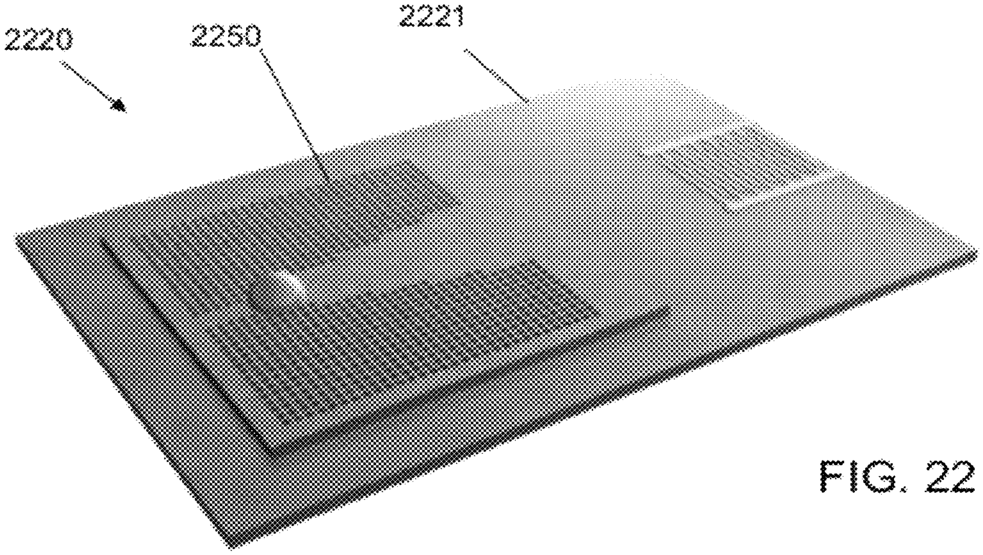
FIG. 22 is a schematic perspective view of a phononic bandgap superstrate disposed on a piezoelectric substrate according to one embodiment of the invention.
Figure 23:
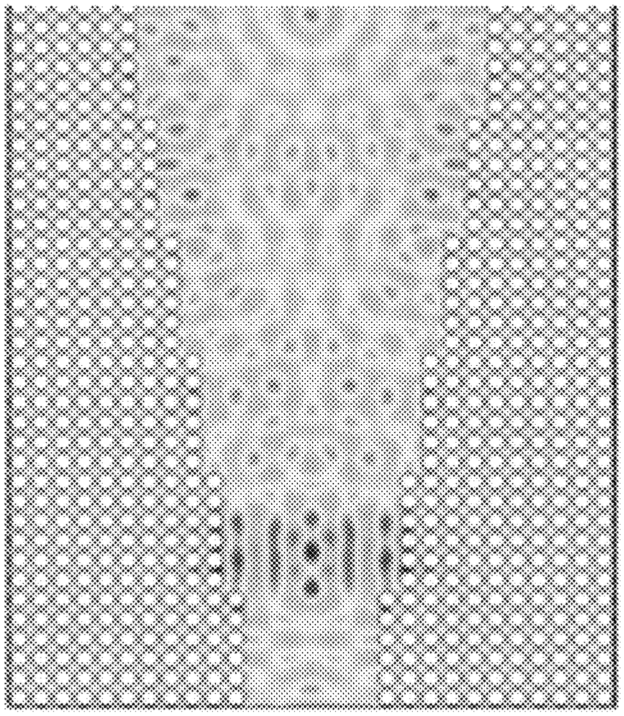
FIG. 23 is a diagram of the results of an acoustic field simulation of the tranducer depicted in FIG. 22.

For example, in certain embodiments, a superstrate (e.g., as described above) can include a phononic bandgap structure. The person of skill in the art, based on the present disclosure, can provide phononic bandgap structures that will reflect, scatter, and focus the acoustic power in the superstrate. While the total acoustic power within the superstrate will generally be less than within the substrate, the focusing of the acoustic power by the phononic bandgap material can increase the acoustic density at a desired area, thereby providing sufficient power for nebulization. Notably, as the superstrate can be removable and interchangeable, the person of skill in the art can provide various superstrates with different phononic bandgap structures, for example, to allow for the manipulation of single drops, multiple drops (for example, for multiplexed mass spectroscopy), or continuous streams coming from a microfluidic device. FIG. 22 is a schematic perspective view of an example of a phononic bandgap superstrate 2250 disposed on a piezoelectric substrate 2221 to form a surface acoustic wave transducer 2220. FIG. 23 is a diagram of the results of the Comsol multiphysics v3.5a simulation of an acoustic field in the phononic bandgap superstrate of FIG. 22 (modeled as a 2D diffraction, assuming that the substrate is lithium niobate driven at 13.2 MHz, and the superstrate is 500 μm thick silicon, with circular air holes formed therein in a rectangular lattice as shown). Darker colors indicate more intense acoustic fields. Notably, standing waves develop, in one region, as a consequence of the sidewalls forming a Fabry-Perot etalon.

Certain embodiments of the invention are described in further detail with respect to the Examples, below

EXAMPLES

Example 1

Figure 6:
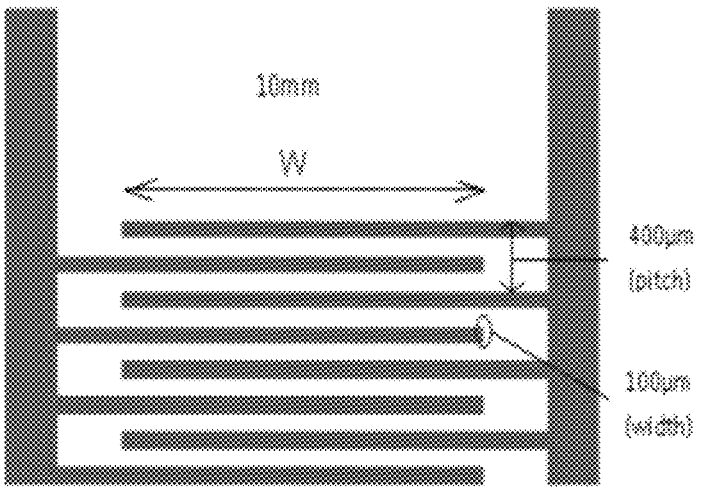
FIG. 6 is a schematic diagram of the electrode design of the surface acoustic wave transducer of Example 1.
Figure 7:
FIG. 7 is a photograph of the surface acoustic wave transducer of Example 1.

A surface acoustic wave transducer was constructed. FIG. 6 is a schematic diagram of the electrode design of the transducer, and FIG. 7 is a photograph of the transducer surface, showing two sets of interdigitating electrodes with an aperture disposed between them. The device was built on a 128 Y-cut X-propagating 3" $LiNbO_3$ wafer diced into four segments of equal size (i.e., to make four devices), each with a 1.5" front edge. Each device included 10 pairs of 100 μm thick interdigitating electrodes on a 400 μm pitch, with an about 10 mm square aperture. The transducer was created using photolithography and lift-off techniques familiar to the person of skill in the art on the $LiNbO_3$ substrate. Briefly, 51828 photoresist was first spun onto the wafer segment at 4000 rpm for 30 s, then patterned using UV exposure through a chrome mask for 6.5 s and developing in the appropriate developer for 40 s. The interdigitating electrodes were produced by deposition of 20 nm Ti (as a bonding layer) followed by evaporation of Au. Lift-off was performed using acetone (2 h).

Samples of fibrinopeptide B (GluFib) were prepared at 10 μM in 50:50 water:methanol with 0.1 wt % formic acid. Angiotensin was prepared in the same solvent/acid system at 1 μM. Both peptides were acquired from Sigma-Aldrich Corp.; solvents were of the highest available quality.

An Agilent MXG Analog Signal Generator N5181A 250 kHz-1 GHz and a Mini Circuits ZHL 5W-1, 5-500 MHz amplifier was used to drive the surface acoustic wave transducer.

Figure 8:
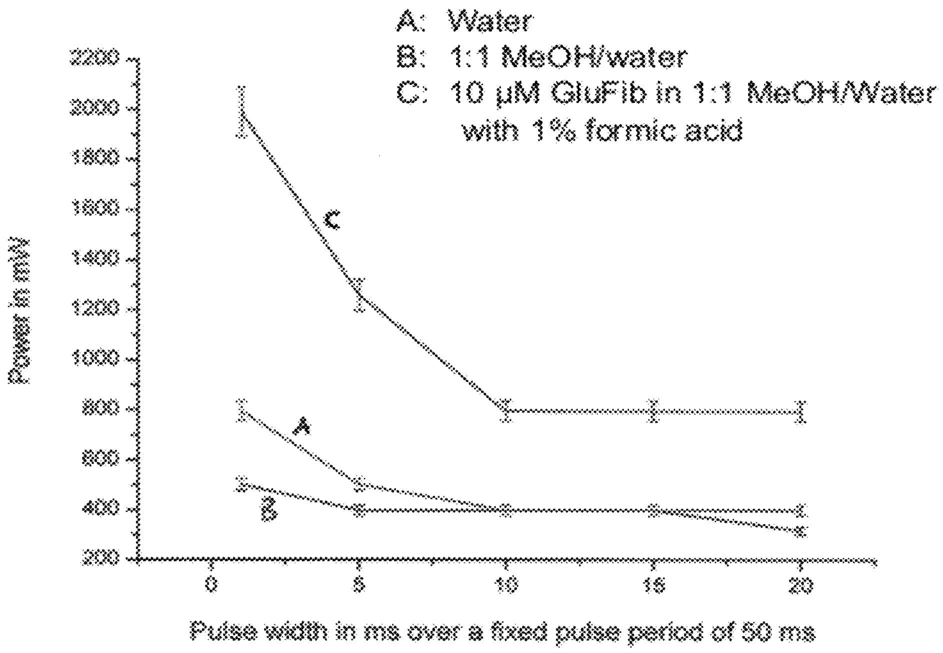
FIG. 8 is a graph showing the nebulization onset powers measured in Example 1.

Before interfacing with the mass spectrometer, the surface acoustic wave transducer was used to nebulize different liquids, including water; 1:1 water:methanol; and the GluFib solution, deposited on the surface of the device in its aperture in an amount of 1 μL. The transducer was driven at 12 MHz. For a pulse period of 50 ms, the pulse width was varied from 1 to 20 ms. The results are shown in FIG. 8. The power required for nebulization varied among the samples, with lowest power requirements observed at 20 ms pulses. For a 20 ms pulse time, the onsets of nebulization were: ~315 mW, 1:1 methanol:water solution; ~400 mW, water; ~800 mW, acidified GluFib solution. Without intending to be bound by theory, the inventors surmise that the fact that water exhibited the lowest onset voltage, and therefore the greatest tendency to nebulize, is related to the surface energy of the drop.

Figure 9:
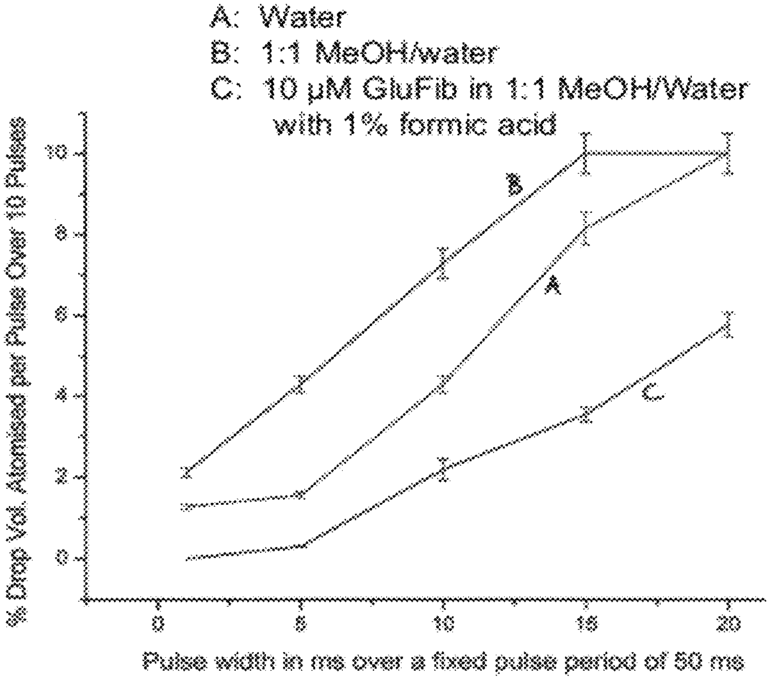
FIG. 9 is a graph showing the volume of liquid ejected vs. pulse width as measured in Example 1.

The volume of liquid sample ejected from the surface acoustic wave transducer was also measured, as shown in FIG. 9. The volume of liquid atomized at 794.3 mW power increased with increasing pulse width. These results demonstrate that the nebulization can be performed in pulsed mode, in order to interrogate a sample over time, as described above.

Figure 10:
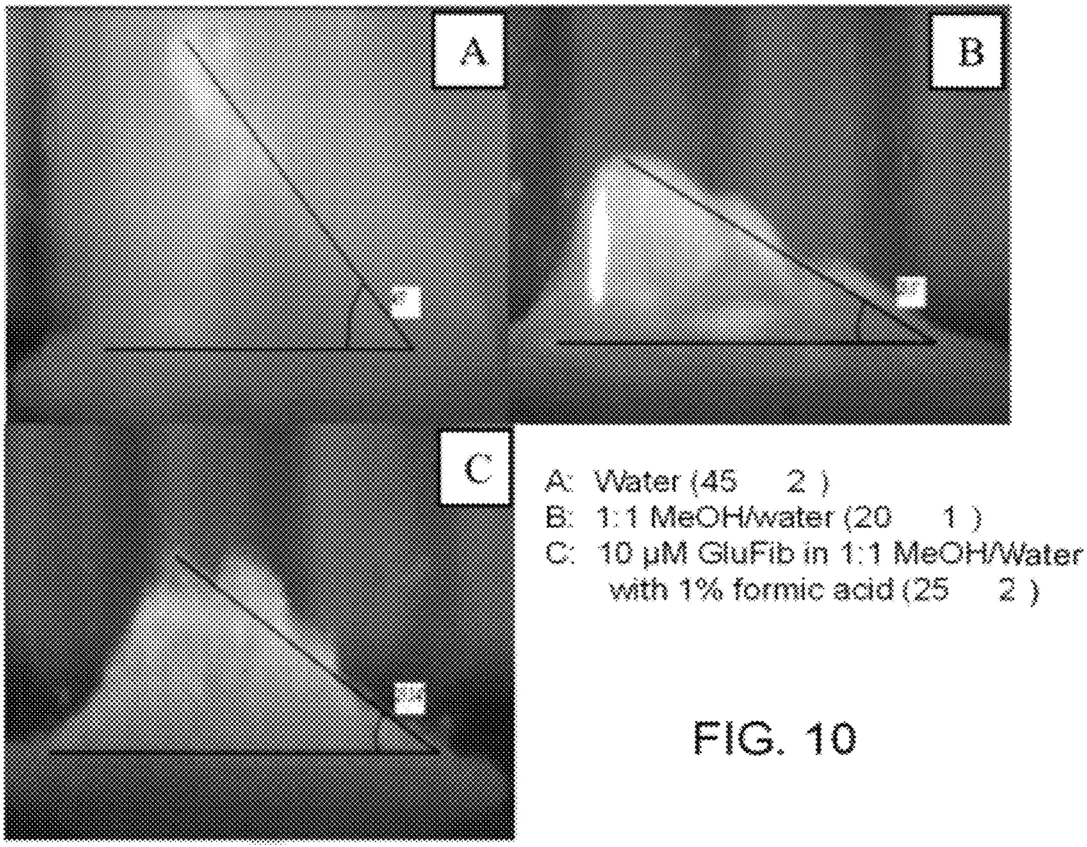
FIG. 10 is a set of photographs showing contact angle at the point of nebulization as determined in Example 1.

The three solvent systems were also tested for the contact angle at the point of nebulization. Droplets emerging from the surface of the surface acoustic wave transducer surface were imaged using a high speed camera at 4000 frames/s. Results are shown in FIG. 10. Water exhibited the highest contact angle (about 45°), while the 1:1 methanol:water and the acidified GluFib solution both exhibited contact angles in the range of 20-25°. The contact angle can direct the person of skill in the art regarding the positioning of the surface acoustic wave transducer with respect to the input of the mass spectrometer, so as to maximize the amount of nebulized suspension captured and analyzed.

Figure 11:
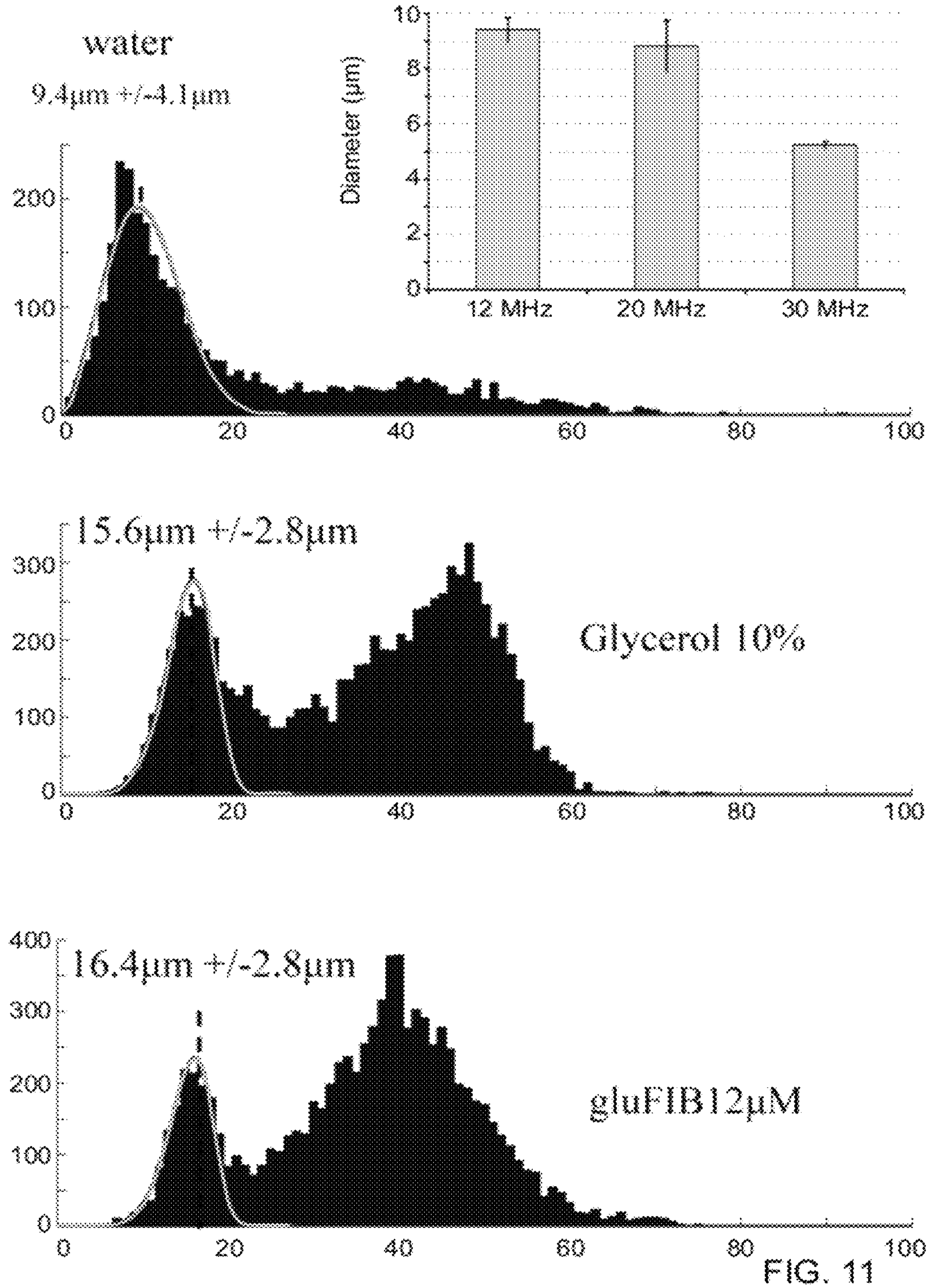
FIG. 11 is a set of graphs showing the dependence of nebulized droplet size on frequency and identity of liquid as determined in Example 1.

The droplet size during nebulization was measured for deionized water using a Phase Doppler Particle Analzyer. The data were fitted with a Weibull distribution and the modes extracted using MATLAB. FIG. 11 shows the results of these experiments for three different liquids: water; 10% aqueous glycerol; and 12 μM GluFib in water. At 12 MHz excitation frequency, the water exhibited an average nebulized droplet size of 9.4 μm, with the average nebulized droplet size decreasing to 8.9 μm and 5.2 μm for 20 MHz and 30 MHz excitation frequencies, respectively. At 12 MHz excitation frequencies, the glycerol and GluFib solutions exhibited larger average nebulized droplet sizes, of 15.6 μm and 16.4 μm, respectively. In all three cases, other droplet size modes (i.e., with larger droplet sizes) were observed; these phenomena do not interfere with the observed mass spectra.

Example 2

Mass spectra were acquired using a hybrid linear ion trap Fourier-transform ion cyclotron resonance mass spectrometer (LTQ-FT, Thermo Scientific). For comparative experiments using ESI, samples were delivered via a fused silica capillary with a pulled tip at 1 μL/min via a syringe pump. The ESI voltage was set at 1.6 kV, with the voltage delivered via a liquid junction electrode as described in Yi, E. C., et al., *Rapid Commun. Mass Spectrom.* 2003, 17, 2093-2098, which is hereby incorporated herein by reference in its entirety.

Figure 12:
FIG. 12 is a picture of a surface acoustic wave transducer positioned at the inlet of a mass spectrometer.

The surface acoustic wave transducer of Example 1 was interfaced with the LTQ-FT mass spectrometer. A picture of the experimental setup is provided as FIG. 12. Using a three dimensional adjustable stage, the transducer was positioned 1 cm below the heated capillary inlet of the mass spectrometer, with the center of the surface acoustic wave device being in line with the capillary inlet. The inlet orifice was maintained at 100 V, and the heated capillary ion transfer tube maintained at 200° C. Surface acoustic wave nebulization was initiated as described above, with a 4.5 kV potential placed on the surface of the transducer. The other instrument settings were as reported in Scherl, A., et al., *J. Am. Soc. Mass Spectrom.* 2008, 19, 891-901, which is hereby incorporated herein by reference in its entirety.

Detection of peptide ions was performed either across the full m/z range, or via selected ion monitoring of the expected precurson m/z values, as appropriate. A maximum ion trap time of 200 ms at 1 μs intervals was used for ESI and surface acoustic wave nebulization.

Figure 13:
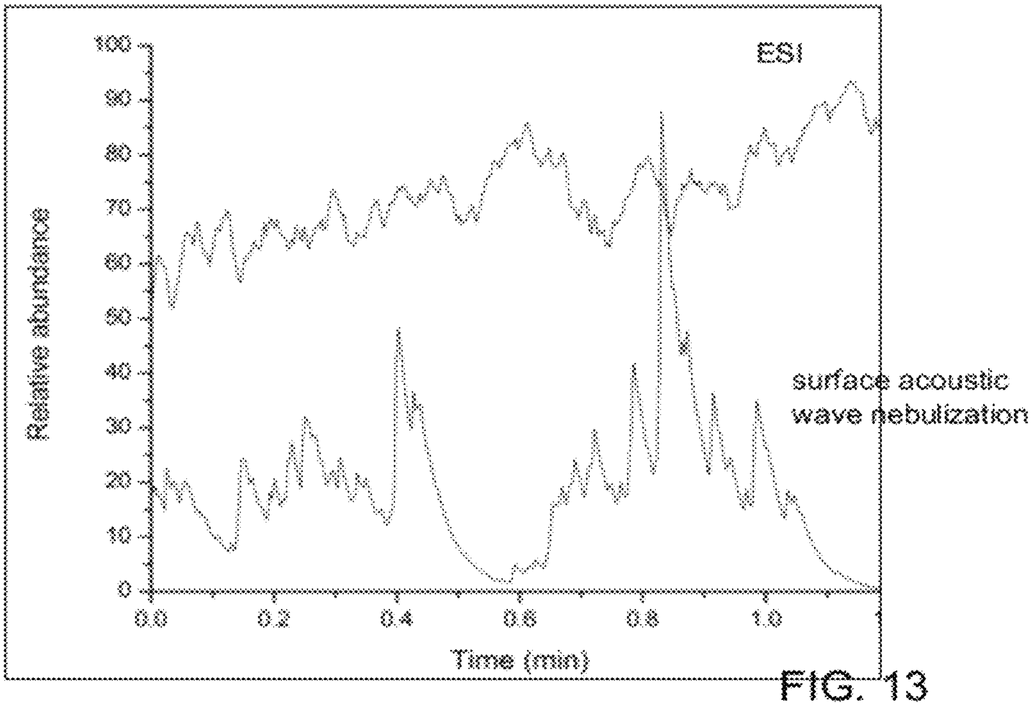
FIG. 13 is a graph of ion abundance as a function of acquisition time for the experiments of Example 2.
Figure 14:
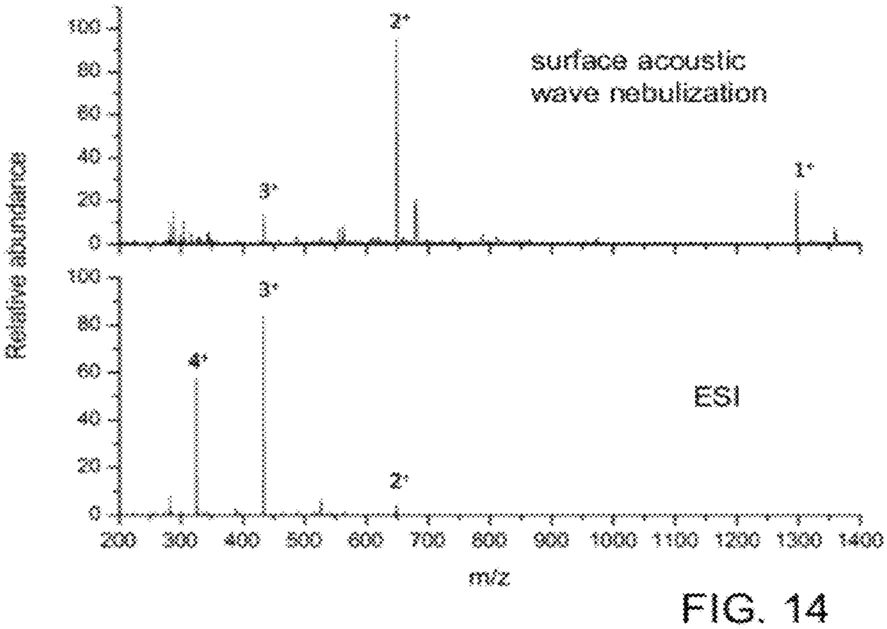
FIG. 14 is a set of mass spectra for the experiments of Example 2.
Figure 15:
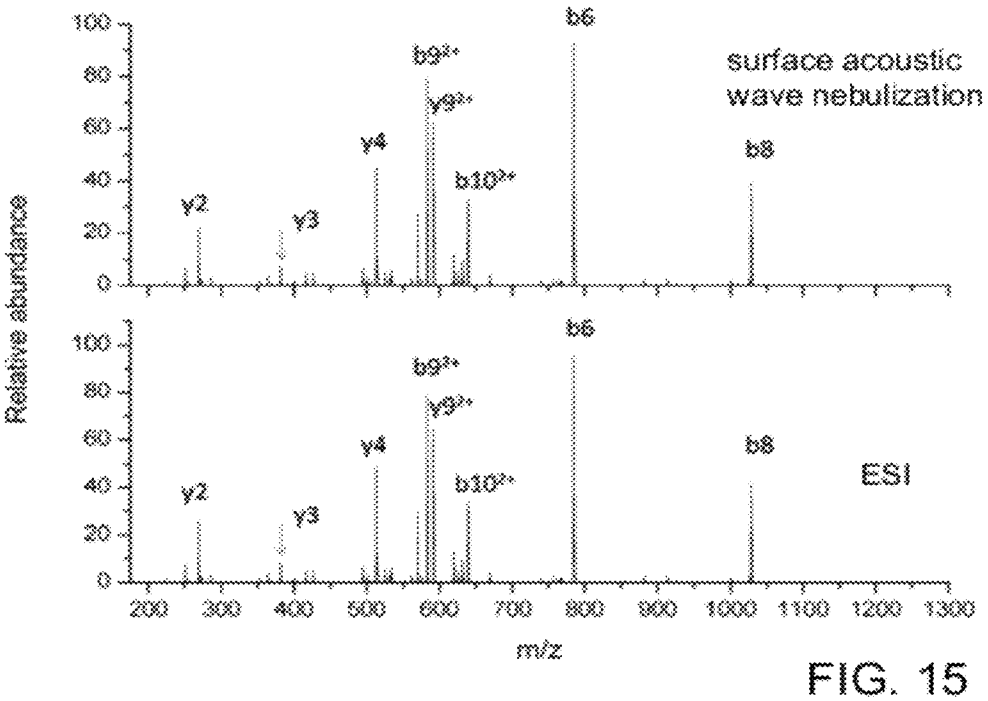
FIG. 15 is a set of tandem mass spectra for the experiments of Example 2.

Mass spectra and fragment ion tandem mass spectra were generated from a 1 μL sample of 1 μM angiotensin (i.e., 1 pmol angiotensin total) nebulized from the surface of the transducer. FIG. 13 plots the ion abundance (i.e., as measured by total ion current) plotted as a function of acquisition time for surface acoustic wave nebulization and ESI. The surface acoustic wave-generated plume lasted about two minutes, and was drifted somewhat with room air current. While the total ion current was a bit more variable for the surface acoustic wave experiments than for the ESI experiments, mass spectra for surface acoustic wave nebulization were qualitatively identical across the experiment. FIG. 14 provides mass spectra for the surface acoustic wave and ESI experiments. Both spectra were generated by averaging the 1.2 minutes of data shown in FIG. 13. Notably, the surface acoustic wave-generated spectrum produced a charge state distribuition with an $[M+2H]^{2+}$ base peak and a $[M+H]^{+}$ ion about 25% of the intensity of the base peak. In contrast, in the ESI spectrum, the base peak was an $[M+3H]^{3+}$ ion, with no detectable $[M+H]^{+}$ ion. While not intending to be bound by theory, this shift toward lower charge state in the surface acoustic wave-generated spectrum suggests that the mechanism for desolvation is fundamentally different than that of ESI. Moreover, the charge state observed by surface acoustic wave nebulization and ionization more closely resemble the expected pKa distribution of the peptide than does the spectrum produced by ESI, suggesting that the surface acoustic wave nebulization technique is less energetic. Finally, the $[M+2H]^{2+}$ ions from both experiments were subjected to collision-induced dissociation. The results are presented in FIG. 15, in which major fragment ions are labeled according to the generally-accepted Reopstorf nomenclature. Spectra were generated by averaging 1.2 minutes of data, as described above. The tandem mass spectra for angiontensin are qualitative identical between the surface acoustic wave and ESI experiments, demonstrating the feasibility of conducting higher-order tandem mass spectrometry experiments using a surface acoustic wave transducer. Such spectra can be used to assign a sequence to a peptide analyte. In all experiments, while data was averaged over many scans, any single scan was sufficient to measure precursor and fragment ion masses sufficiently to identify angiotensin.

Example 3

Figure 16:
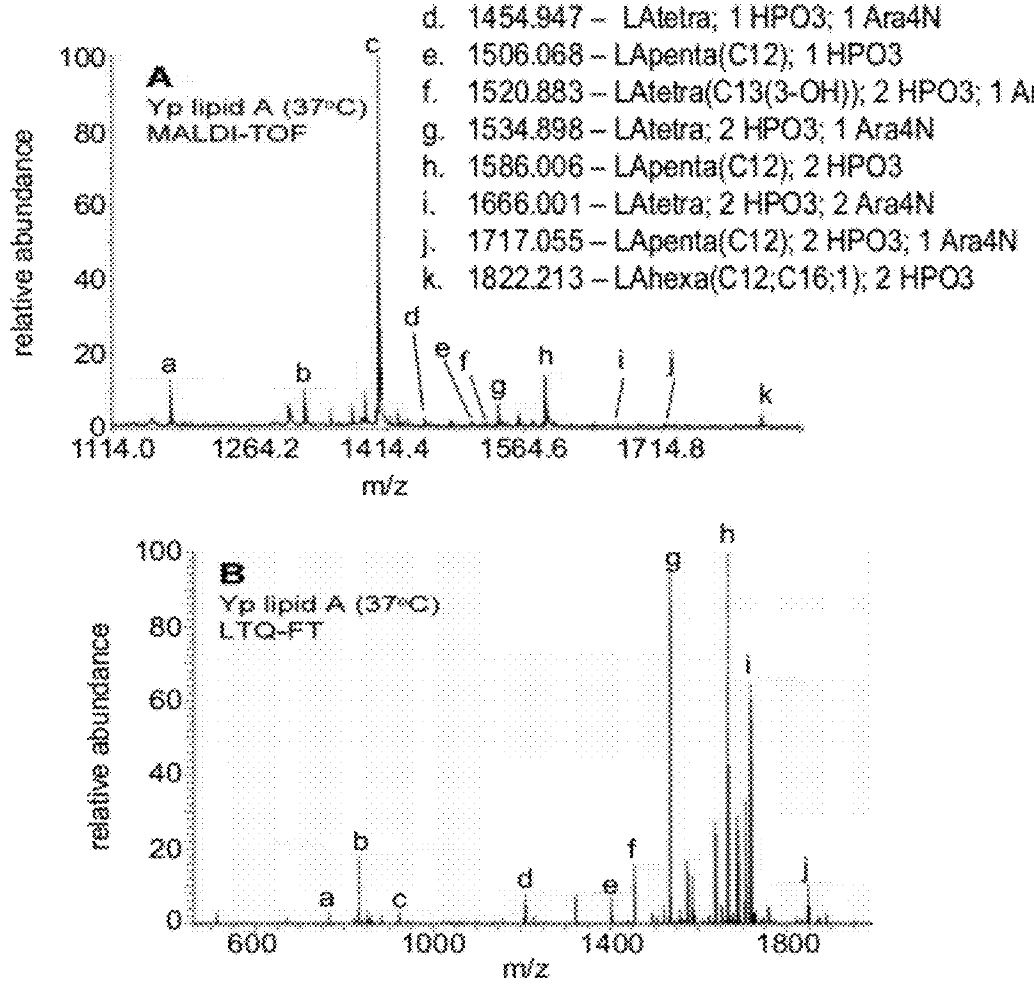
FIG. 16 is set of mass spectra for MALDI and ESI experiments on lipid A as described in Example 3.

Lipid A endotoxin from Gram-negative bacteria was analyzed. Lipid A is a glycolipid which typically (and problematically for structure determination) displays more monosaccharide modifications when measured by ESI than MALDI. FIG. 16 shows example mass spectra (on different m/z scales) of *Yersinia pestis* Lipid A obtained by (A) MALDI-TOF and (B) ESI-LTQFT-ICR-MS. Notably, the same sample produces drastically different data. While the MALDI spectrum is dominated by a tetra-acylated structure (m/z~1403 g/mol) with minor ions representing monosaccharide additions, the ESI spectrum displays a dramatically lower abundance at m/z~1403 g/mol. The dominant ESI generated ions represented tetra-acylated structure with both single and double aminoarabinose modifications (m/z~1534 and 1665, respectively). Moreover, lipid A extracts can clog ESI tips.

Figure 17:
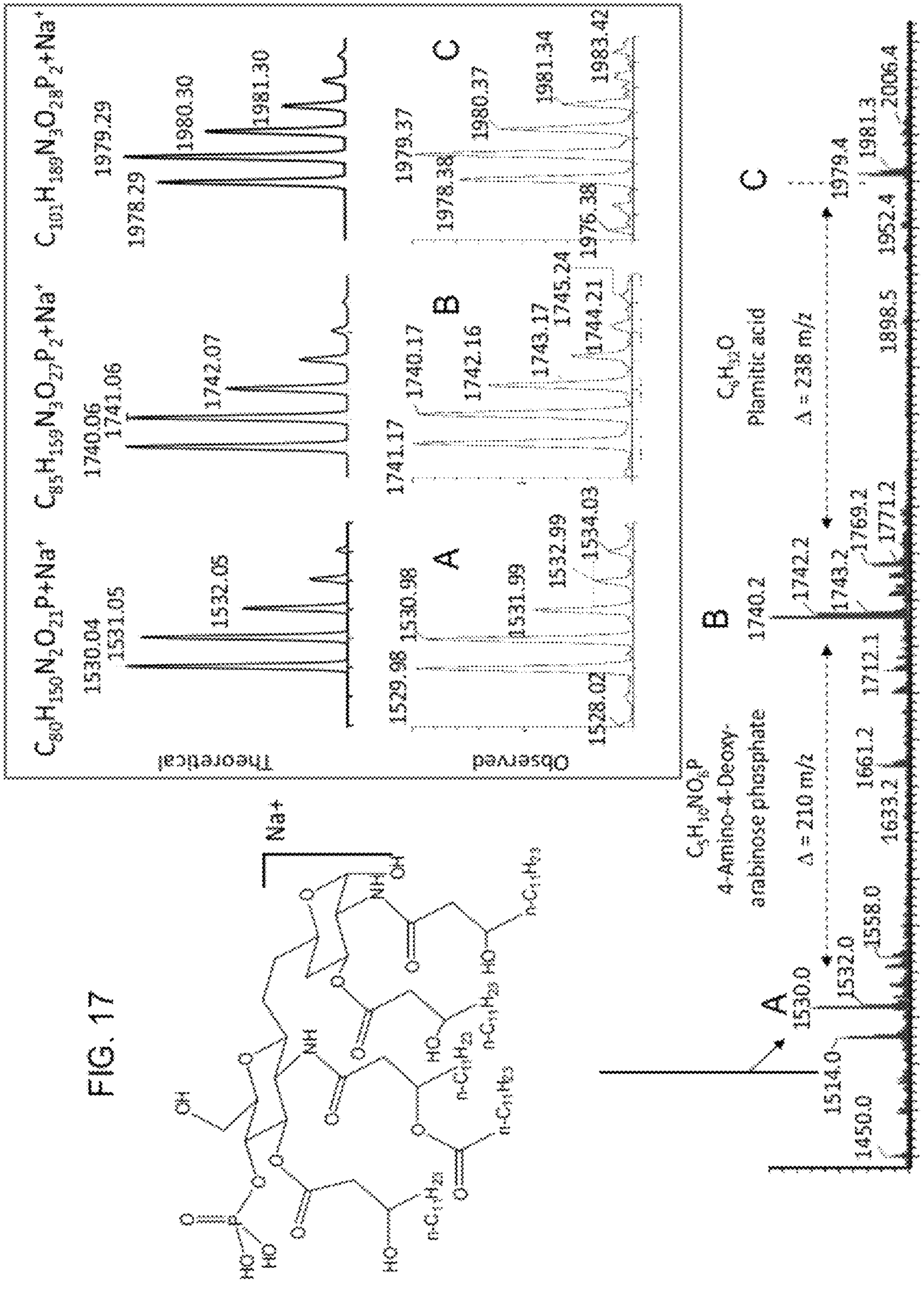
FIG. 17 is a set of mass spectra for lipid A generated using surface acoustic wave nebulization, as described in Example 3.
Figure 18:
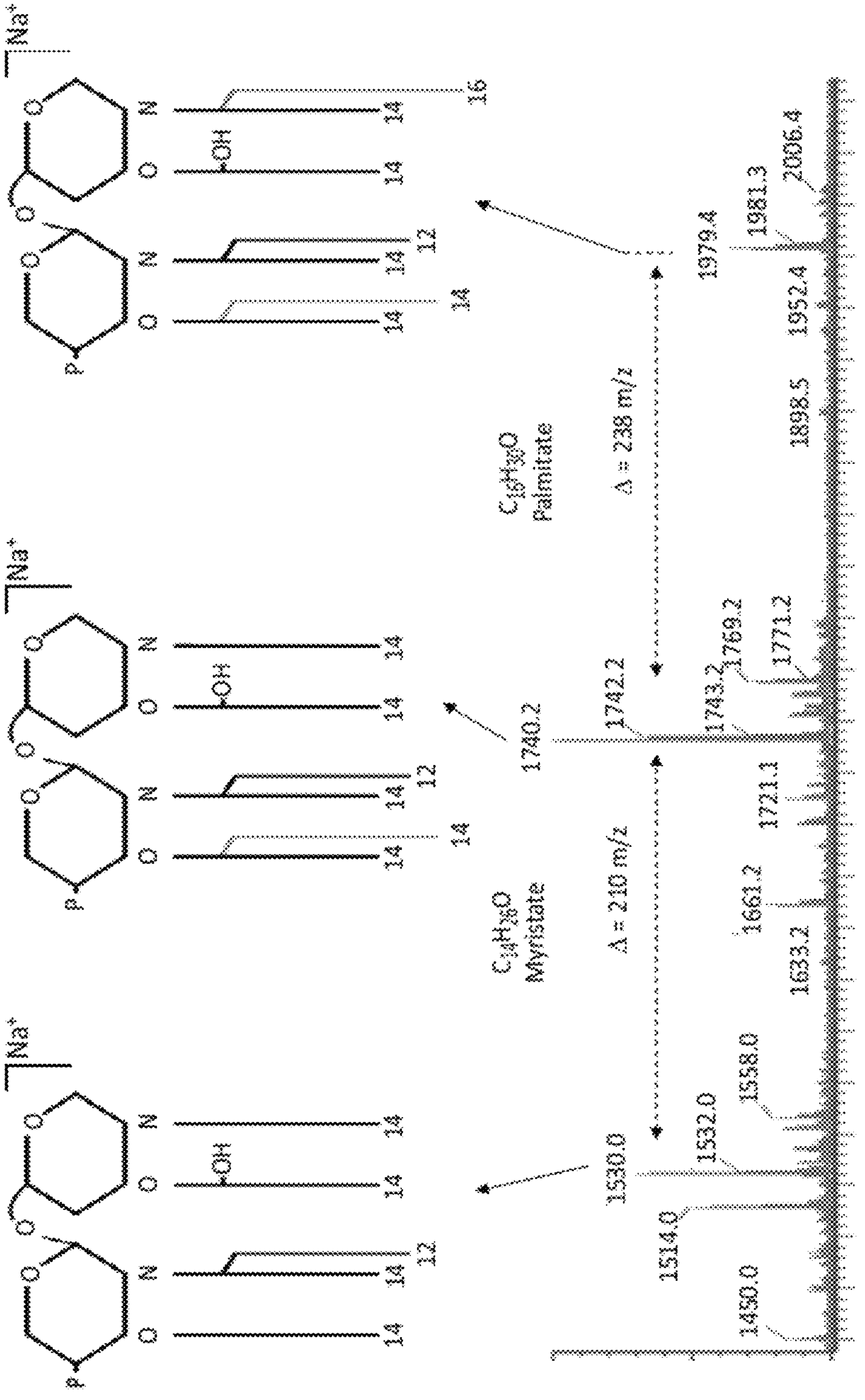
FIG. 18 is the mass spectrum of FIG. 17 annotated with fragment analysis.
Figure 19:
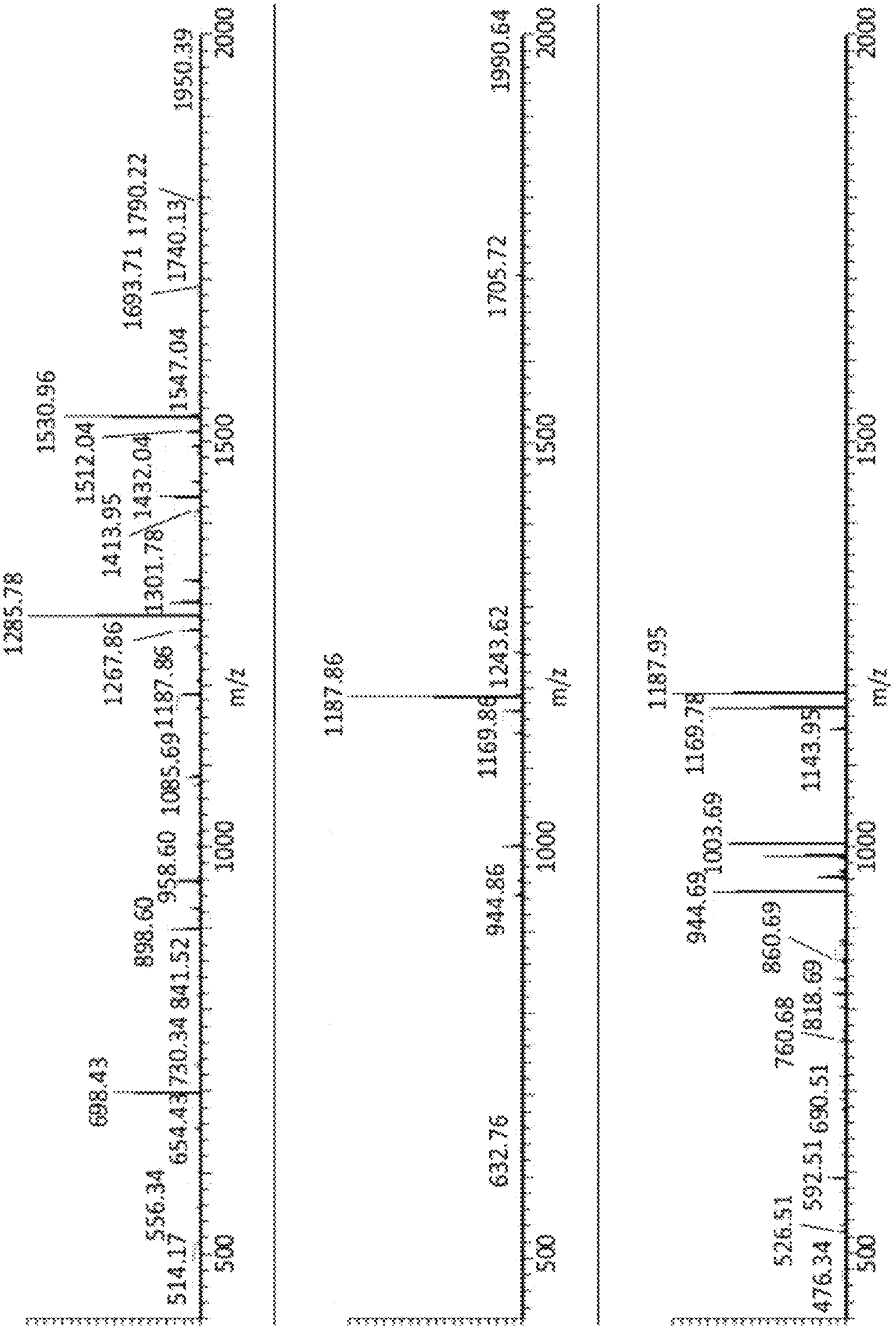
FIG. 19 is a set of tandem mass spectra for lipid A, generated using surface acoustic wave nebulization, as described in Example 3.
Figure 20:
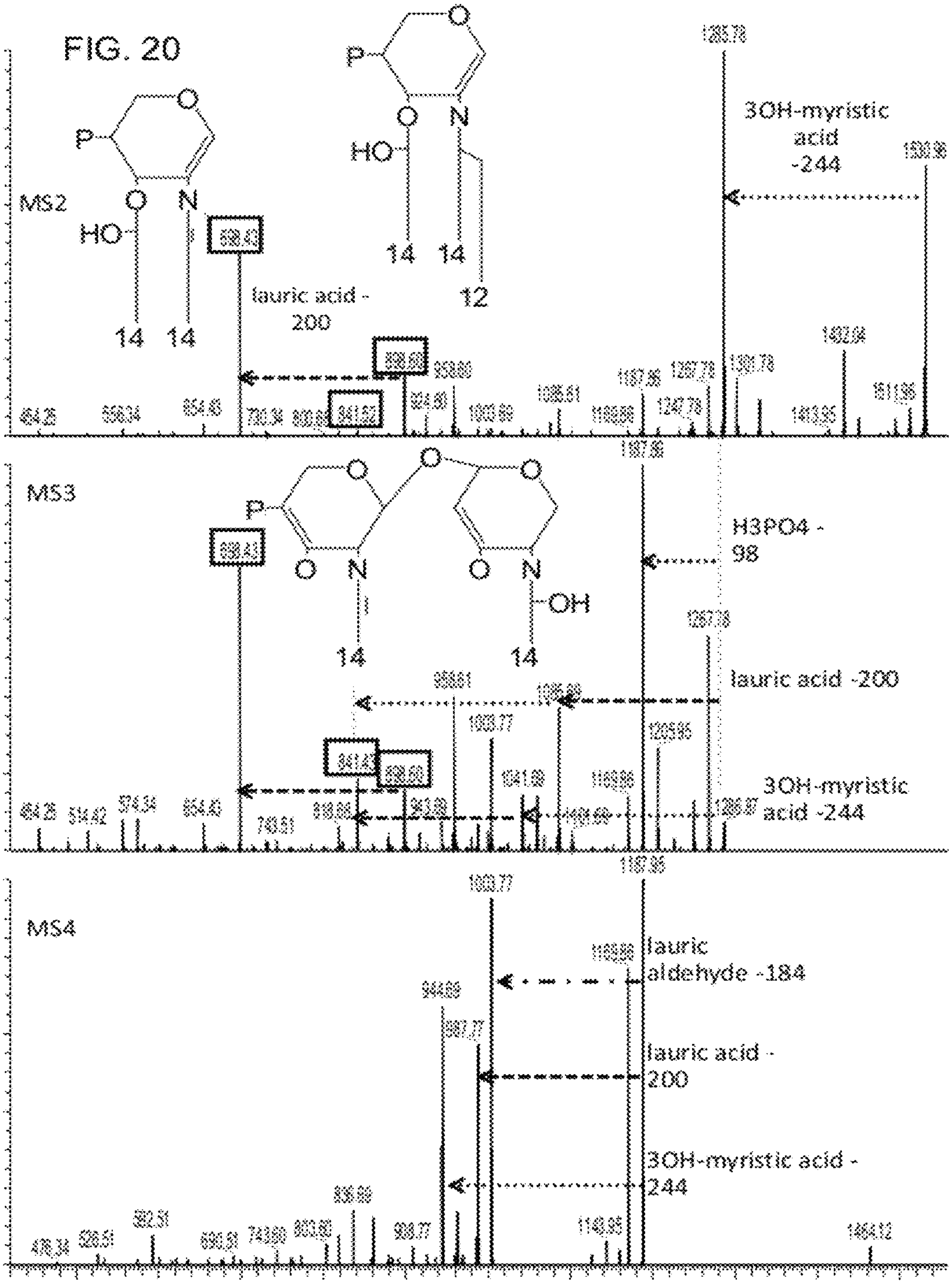
FIG. 20 is the set of tandem mass spectra of FIG. 19, annotated with fragment analysis.

FIG. 17 is a set of mass spectra and the structure of Lipid A generated using surface acoustic wave transduction of a 50:50 methanol/chloroform suspension of Lipid A and a SYNAPT mass spectrometer. Notably, the parent ion at m/z~1979 g/mol has high abundance (especially as compared to the ESI mass spectra of FIG. 19); and two important degradation ions (at m/z~1740, corresponding to loss of palmitate; and at m/z~1530, corresponding to further loss of phosphosaccharide) are clearly visible. FIG. 18 provides additional analysis of the mass spectra with respect to various fragments. The same Lipid A suspension was analyzed using surface acoustic wave nebulization in a Velos ion trap mass spectrometer (including an S-lense ion trap) in positive mode. The precursor mass spectrum is not shown, but appeared similar to that of FIG. 14. FIG. 19 presents three mass spectra of sequential fragments. To generate the top mass spectrum of FIG. 19 (MS2), all ions but m/z ~1530 g/mol were ejected from the trap, then the m/z~1530 g/mol ions were activated by collision, and the fragment ions recorded for the spectrum. Then the process is repeated with m/z~1286 g/mol ions (one of the MS2 fragments of the m/z~1530 g/mol ions) to provide the MS3 spectrum; and with m/z~1188 g/mol (one of the MS3 fragments of the m/z~1286 g/mol ions) to provide the MS4 spectrum. Notably, this result demonstrates that surface acoustic wave nebulization can provide more than adequate ions for sequential mass spectrometry experiments. Similarly, MS1, MS2 and MS3 signals for angiotensin II were visible on a single scan basis at 1 μM concentrations. FIG. 20 provides additional analysis of the various ions of the MS2, MS3 and MS4 spectra.

Example 4

Figure 21:
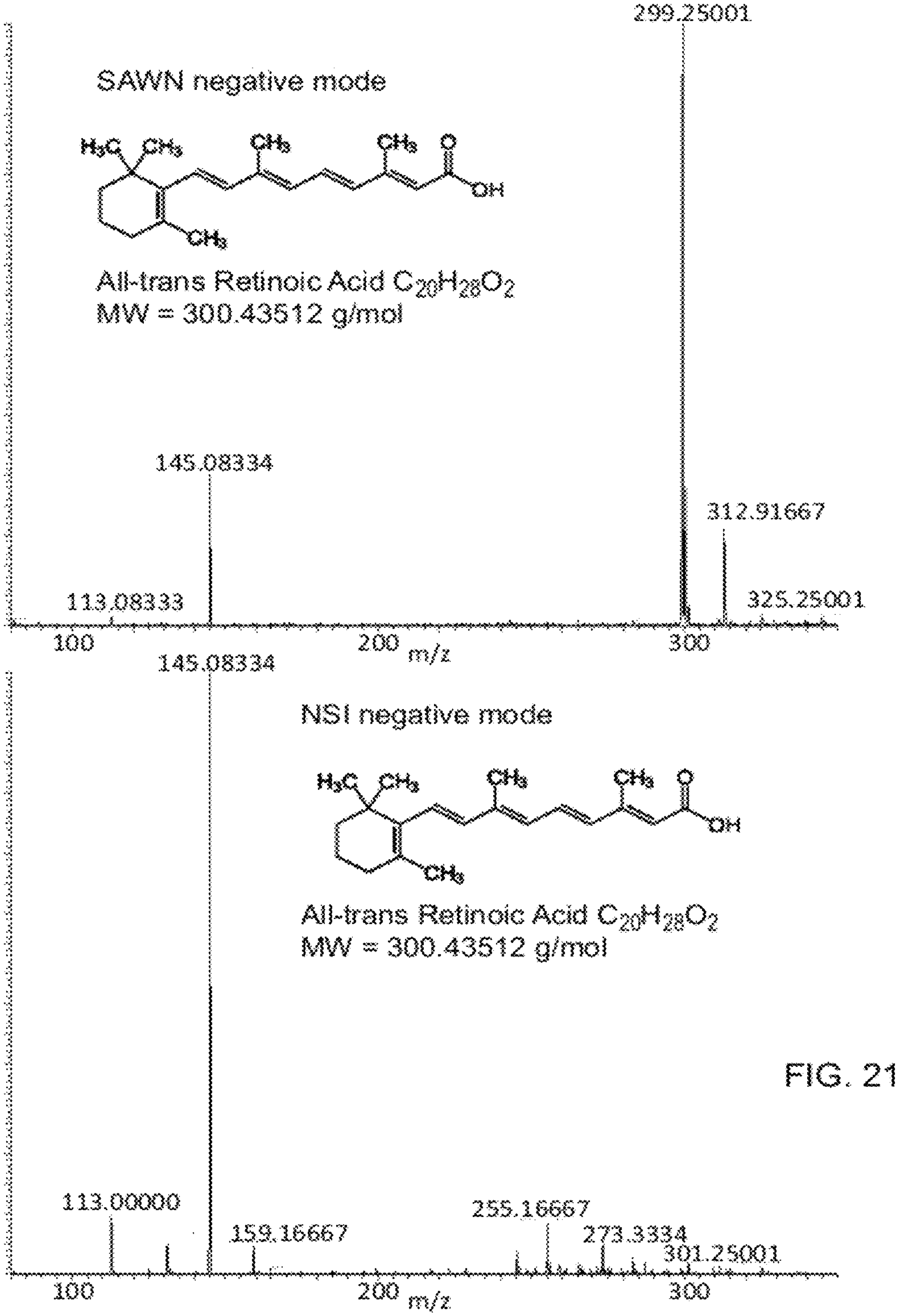
FIG. 21 is a pair of negative mode mass spectra of retinoic acid, comparing surface acoustic wave nebulization with ESI, as described in Example 4.

Suspensions of retinoic acid in ethanol were prepared and analyzed generally as described above, using both surface acoustic wave transduction and ESI. Negative mode mass spectra are provided in FIG. 21. Notably, the fragmentation patterns demonstrate that surface acoustic wave transduction is much less energetic, providing an $[M-H]^-$ base peak (i.e., 299 g/mol, corresponding retinoic acid to retinoic acid without a proton), as compared to the m/z=145 g/mol base peak of the ESI spectrum.

Example 5

Figure 24:
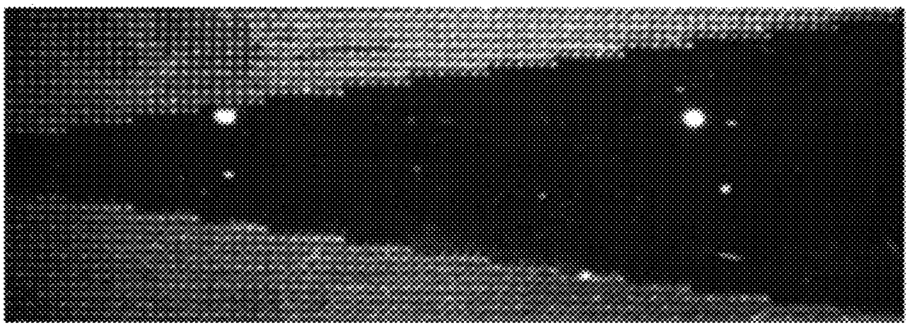
FIGS. 24 and 25 are pictures of a photonic bandgap structure before and during transduction, respectively, as described in Example 5.
Figure 25:
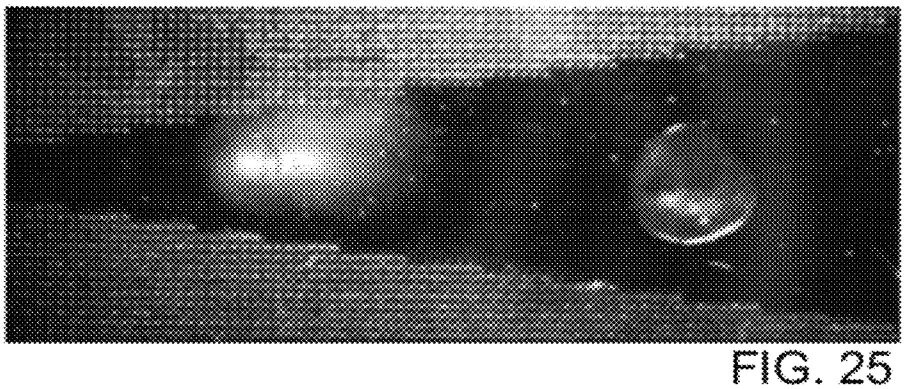

A silicon superstrate was formed with a phononic bandgap structure, as described above (holes formed in silicon), with a tapered aperture defined thereby. The silicon superstrate was placed on top of a surface acoustic wave tranducer as described above in Example 1. FIG. 24 is a top view of the silicon superstrate, with two drops of water placed thereon, one in the narrower part of the tapered aperture, and one in the wider part of the tapered aperture. The drops are barely visible in FIG. 24. FIG. 25 is a top view of the same structure, with driving of the tranducer at 13.2 MHz. The drop in the narrow part of the tapered aperture is nebulized, while the drop in the wider part of the tapered aperture becomes more visible as it is agitated, even though energy is not sufficient for nebulization.

The foregoing description and examples provide specific details for a thorough understanding of, and enabling description for, embodiments of the disclosure. However, one skilled in the art will understand that the disclosure may be practiced without at least some of these details. In other instances, well-known structures and functions have not been shown or described in detail to avoid unnecessarily obscuring the description of the embodiments of the disclosure. Thus, it is intended that the present invention cover the modifications and variations of this invention provided they come within the scope of the claims and their equivalents.

What is claimed is:

1. A method for analyzing an analyte, the method comprising:

nebulizing a suspension of the analyte in a solvent with a surface acoustic wave transducer to provide nebulized suspension wherein the surface acoustic wave transducer is operatively coupled to an array of scattering elements that guide the acoustic radiation emitting from the surface acoustic wave transducer; and performing mass spectrometry on the nebulized suspension.

2. The method according to claim 1, wherein the array of scattering elements forms a phononic bandgap material.

3. The method according to claim 1, wherein the analyte is non-volatile.

4. The method according to claim 1, wherein the analyte is a biomolecule.

5. The method according to claim 1, wherein the solvent is water, a lower alcohol, or a mixture thereof.

6. The method according to claim 1, further comprising, before nebulizing the suspension, performing a reaction, separation or purification of the analyte in a microfluidic device operatively coupled to the surface acoustic wave transducer.

7. The method according to claim 1, wherein the nebulization is performed discontinuously.

8. The method according to claim 1, wherein the average droplet size of the nebulized mode is in the range of about 0.1 μm to about 50 μm.

9. The method according to claim 1, wherein the surface acoustic wave transducer comprises a superstrate disposed on a piezoelectric substrate, and wherein the suspension is nebulized from the surface of the superstrate.

10. The method according to claim 1, wherein the surface of the surface acoustic wave transducer has an organic-containing coating formed thereon.

11. The method according to claim 1, wherein the surface of the surface acoustic wave transducer has regions of different wettability.

12. The method according to claim 1, wherein the nebulization of the suspension is from a substantially flat surface of the surface acoustic wave transducer.

13. The method according to claim 1, wherein the surface of the transducer is not at an electrical potential substantially different from ground.

14. The method according to claim 1, wherein the nebulized suspension is directed to the input of the mass spectrometer with an ion funnel.

15. The method according to claim 1, wherein the surface acoustic wave transducer comprises interdigitated electrodes on the surface of a piezoelectric substrate.

16. The method according to claim 1, wherein the nebulization and performance of mass spectrometry are repeated multiple times.

17. The method according to claim 1, wherein the mass spectrometry results in a detectable $[M+H]^+$ or $[M-H]^-$ peak.

18. An analytical system for analyzing an analyte provided as a suspension in a solvent, the analytical system comprising:

a mass spectrometer having an input;

a surface acoustic wave transducer operatively coupled to the mass spectrometer, so that when the surface acoustic wave transducer is used to nebulize the suspension to provide ionized analyte, at least some of the nebulized suspension enters the input of the mass spectrometer and wherein the surface acoustic wave transducer is operatively coupled to an array of scattering elements that guide the acoustic radiation emitting from the surface acoustic wave transducer.

19. The method according to claim 18, wherein the array of scattering elements forms a phononic bandgap material.

20. The analytical system according to claim 19, wherein the surface acoustic wave transducer is operatively coupled to a microfluidic device.

21. The analytical system according to claim 19, further comprising a source of carrier gas, a nebulized stream of solvent, or a combination thereof adapted to direct the nebulize suspension to the input of the mass spectrometer.

22. The analytical system according to claim 19, wherein the surface acoustic wave transducer comprises a superstrate disposed on a piezoelectric substrate.

23. The analytical system according to claim 19, wherein the surface of the surface acoustic wave transducer has an organic-containing coating formed thereon.

24. The analytical system according to claim 19, wherein the surface of the surface acoustic wave transducer has regions of different wettability.

25. The analytical system according to claim 19, wherein the surface of the acoustic wave transducer is substantially flat in the region from which the suspension is to be nebulized.

26. The analytical system according to claim 19, wherein the system includes an ion funnel operatively disposed between the surface acoustic wave transducer and the input of the mass spectrometer.

27. The analytical system according to claim 19, wherein the surface acoustic wave transducer comprises interdigitated electrodes on the surface of a piezoelectric substrate.

* * * * *

UNITED STATES PATENT AND TRADEMARK OFFICE

CERTIFICATE OF CORRECTION

PATENT NO. : 8,415,619 B2
APPLICATION NO. : 13/296793
DATED : April 9, 2013
INVENTOR(S) : David R. Goodlett, Scott Heron and Jonathan M. Cooper It is certified that error appears in the above-identified patent and that said Letters Patent is hereby corrected as shown below:

On the title page, item [73], please delete Assignee "University of Glascgow" and add Assignee -- University of Glasgow --.

On the title page, item [73], please add the additional Assignee -- University of Washington through its Center for Commercialization (Seattle, WA) --.

Signed and Sealed this
Eighth Day of October, 2013

Teresa Stanek Rea
*Deputy Director of the United States Patent and Trademark Office*